US012702881B1

(12) United States Patent
Yeadon

(10) Patent No.: US 12,702,881 B1
(45) Date of Patent: Aug. 11, 2026

(54) CONCEALED SPRINKLER COVER

(71) Applicant: SPARK IP LLC, New York, NY (US)

(72) Inventor: Peter Yeadon, New York, NY (US)

( * ) Notice: Subject to any disclaimer, the term of this patent is extended or adjusted under 35 U.S.C. 154(b) by 0 days.

(21) Appl. No.: 19/217,500

(22) Filed: May 23, 2025

(51) Int. Cl.
*A62C 37/11* (2006.01)

(52) U.S. Cl.
CPC .................................... *A62C 37/11* (2013.01)

(58) Field of Classification Search
CPC ......... A62C 37/09; A62C 37/10; A62C 37/11; A62C 37/12; A62C 37/14; A62C 37/16; A62C 37/20
See application file for complete search history.

(56) References Cited

U.S. PATENT DOCUMENTS

| | | | | |
|---|---|---|---|---|
| 4,618,001 A * | 10/1986 | Hoening | A62C 37/12 169/38 |
| 5,117,916 A * | 6/1992 | Ohta | G08B 17/02 169/17 |
| 8,474,545 B2 | 7/2013 | Takeuchi | |
| RE49,231 E | 10/2022 | Abels | |
| 2003/0196821 A1* | 10/2003 | Kikuchi | A62C 37/09 169/37 |
| 2011/0203814 A1* | 8/2011 | Thompson | A62C 37/09 169/56 |
| 2015/0343474 A1* | 12/2015 | Connery | B05B 15/16 427/282 |
| 2019/0099983 A1* | 4/2019 | Tow | A62C 37/09 |

FOREIGN PATENT DOCUMENTS

| | | |
|---|---|---|
| JP | H09187529 A * | 7/1997 |
| JP | H11146926 A * | 6/1999 |
| JP | 2003225321 A * | 8/2003 |
| JP | 2004357733 A * | 12/2004 |
| JP | 2008264021 A * | 11/2008 |

OTHER PUBLICATIONS

English language translation of JP-H11146926-A to Matoba (Year: 1999).*
English language translation of JP-2003225321-A to Ishikawa (Year: 2003).*
English language translation of JP-2004357733-A to Nakano (Year: 2004).*
Garvin Industries White Ceiling Plate with 1/4 Inch Edge Taper; from Amazon listing printed Jan. 2, 2026, which includes product reviews from at least as early as 2021, as well as an indication that the product was “First Available: Feb. 18, 2016”; 7 pages ( Year: 2016).*

* cited by examiner

*Primary Examiner* — Darren W Gorman
(74) *Attorney, Agent, or Firm* — Joseph D. Hodler

(57) ABSTRACT

A sprinkler cover apparatus conceals sprinkler heads using temperature-responsive materials that release the cover when exposed to a set temperature, allowing unobstructed water flow. The apparatus is an imperceptible component of the ceiling or wall. Embodiments include single- and multi-piece designs, mounted to the ceiling or sprinkler head housing. Some embodiments do not contact the sprinkler head directly. Actuation is achieved via materials like shape-memory polymers (SMPs), shape-memory alloys (SMAs), liquid crystalline polymers, melting substances (e.g., wax, solder), or bimetals. These materials change shape or phase at specific temperatures, enabling automatic cover release.

17 Claims, 18 Drawing Sheets

CONCEALED SPRINKLER COVER

FIELD

The present disclosure generally relates to fire sprinkler covers, and more specifically to an apparatus and process utilizing temperature-responsive materials for removing a discrete sprinkler cover.

BACKGROUND

Sprinkler systems provide a means of extinguishing fires, but the systems are not always attractive or desired by designers. Sprinkler head covers were created to address aesthetics, but they are still visible and an undesirable distraction from the architecture.

Furthermore, the installation of these covers requires precisely positioning a hole in the ceiling, directly in line with the sprinkler head. These covers are generally soldered into the sprinkler head housing, creating a fixed connection, inhibiting safety inspections. The solder has a limited range of available melting temperatures. The solder also creates a physical bond between the cover and the sprinkler head housing, that generally requires an additional force to push the cover away from the ceiling.

A new sprinkler head cover is needed, that is easy to install, readily removed for inspection, detaches from the ceiling at a desired temperature, and is imperceptible.

SUMMARY

The sprinkler cover apparatus is designed to conceal a sprinkler head from view and is made from temperature-responsive materials. When exposed to a specified temperature, the cover detaches, allowing water to flow from the sprinkler unobstructed.

The apparatus comes in multiple embodiments. A two-piece version is comprised of a collar and a removable cover. The collar is affixed to the ceiling and features an aperture through which the sprinkler head discharges water, while the cover conceals the sprinkler during normal conditions. A single-piece version is mounted to a sprinkler head housing or directly to the ceiling. Designs also address aesthetic integration with the ceiling.

In some embodiments, covers and collars can be designed for different sized apertures. In some embodiments, the system is independent of the sprinkler itself, meaning the cover and collar do not physically contact the sprinkler head.

In some embodiments, the apparatus is comprised of actuators that facilitate the opening of the aperture. These actuators can be part of the cover, the collar, or separate from both. Actuators are comprised of temperature-responsive materials, which change shape or phase when heated. These materials can shift between a deformed and original shape, based on reaching a transformation temperature.

In some embodiments, shape-memory materials (e.g., shape-memory polymers and shape-memory alloys) are deformed, and then revert to their original shape when heated to a set temperature. The transformation temperature varies by embodiment, ranging from as low as 0° C. to as high as 100° C., but can exceed those limits if required by the circumstances.

Shape-memory polymers (SMPs) include polyurethanes, PLA, EVA, and others. SMPs can respond to multiple stimuli-heat, light, electricity, and more- and can stretch significantly (up to 800%). Additives such as carbon nanotubes or metal powders can enhance SMP performance by improving thermal or electrical conductivity. This tailoring supports additional functionality depending on the use case.

Shape-memory alloys (SMAs), such as nickel-titanium or copper-based alloys, operate via solid-state phase transitions between martensite (deformable) and austenite (original) states. These materials are more costly and provide less strain but offer high force and environmental resistance. SMAs are typically found in wire or spring form, with customizable transformation temperatures. In some embodiments, electrical input may aid faster transformation by providing resistance heating, reducing actuation time to under one second.

Liquid crystalline polymers and elastomers (LCPs/LCEs) are shape-memory materials with reversible transformation between two solid states. In some embodiments, temperature-responsive materials are designed to melt, such as solder or wax, which then causes the cover to release. In some embodiments, these melting materials are encased in higher melting point tubes to create actuators that reset shape as the material melts. Bimetals offer another solution, converting temperature changes into mechanical movement due to differing expansion rates of bonded metals. They provide simple, controlled displacement for actuation.

The figures illustrate various embodiments. Covers with temperature-responsive actuators may insert into a collar, connect directly with a sprinkler head housing, or attach directly to the ceiling. When the cover reaches transformation temperature, it falls away, enabling the sprinkler to operate.

BRIEF DESCRIPTION OF THE DRAWINGS

Particular descriptions of the principles briefly described above are rendered by specific embodiments illustrated in the drawings. These drawings depict only exemplary embodiments of the disclosure and are not limiting of its scope. The principles and advantages herein are described and explained with additional specificity and detail by the accompanying drawings in which.

DETAILED DESCRIPTION

Figure 1:
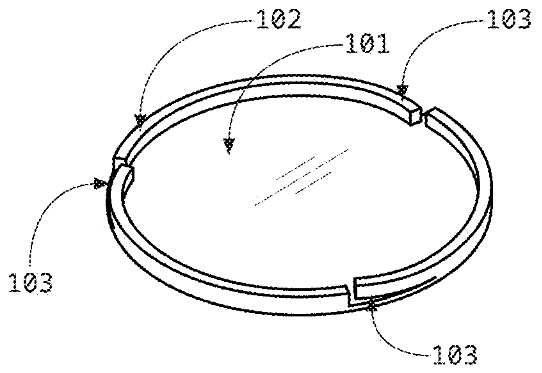
FIG. 1 shows a top perspective view of one embodiment of a sprinkler cover in its original shape.

The description set forth below in connection with the appended drawings is intended to be a description of various illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

A sprinkler cover apparatus hides a sprinkler head from view. The sprinkler cover apparatus is comprised of temperature-responsive materials. When the materials reach a certain temperature (e.g., as the result of a fire), the cover falls away, permitting the sprinkler head to emit water without obstruction. In some embodiments, the sprinkler cover apparatus is comprised of one piece applied directly to the ceiling. In other embodiments, the sprinkler cover apparatus is comprised of two pieces, a cover and a collar. The collar is applied to the ceiling, and provides an aperture through which the sprinkler head emits water. A cover is placed within the aperture to hide the sprinkler head from view during normal conditions.

Covers and collars may be configured to span any sized opening and allow any sized aperture for the emission of water. In one embodiment, the apparatus is independent of the sprinkler system. The cover and collar have no direct contact with the sprinkler head.

In one embodiment, an actuator moves, causing the sprinkler cover to open the aperture. In one embodiment, the actuator is a component of the cover. In another embodiment, the actuator is a component of the collar. In other embodiments, the actuator is independent of the cover and collar. In one embodiment, the actuator is comprised of temperature-responsive material.

In one embodiment, a temperature-responsive material is configured to form at least two shapes, an original shape, and a deformed shape. Both the original shape and the deformed shape may be fixed to desired geometries. The material has a specified transformation temperature, which is selected as an inherent property. Transformation temperatures may also be referred to as transition temperatures, as they cause the transition between phases as well as shape. In some embodiments, the transformation temperature is referred to as an activation temperature. The material reverts from its deformed shape to its original shape at or above the transformation temperature. Example temperature-responsive materials include shape-memory polymers, shape-memory alloys, liquid crystalline polymers, alloys, bi-metals, and waxes.

In one embodiment, while the material is below the transformation temperature, the material is mechanically manipulated, and deformed, to create its deformed shape. The material is then heated to the transformation temperature, causing the material to revert to its original shape. This process of deformation to the deformed shape and transformation back to the original shape may occur multiple times over the life of the material.

In one embodiment, the transformation temperature is specified at 40° C. In another embodiment, the transformation temperature is specified at 50° C. In another embodiment, the transformation temperature is specified at 57° C. In another embodiment, the transformation temperature is specified at 74° C. The transformation temperature may be specified as low as 0° C., or as high as 100° C.

In alternative embodiments, the temperature-responsive material may also respond to an electrical stimulus. An electrical charge may invoke a transformation from the deformed shape back to the original shape.

In one embodiment, the temperature-responsive material is a shape-memory polymer (SMP). Example SMPs include polyurethanes (PU), polytetrafluoroethylene (PFTE), polylactide (PLA), ethylene-vinyl acetate (EVA), and polyester blends such as poly (¿-caprolactone) and poly (butylene terephthalate). SMPs can undergo transformations from a deformed shape to an original shape through a variety of external stimuli. These include changes in temperature, as well as light, electricity, magnetic field, and pH.

SMPs may possess a wide range of physical characteristics. They may be soft or hard, elastic or rigid, thermoplastic or thermoset. SMP's may deform by stretching up to 800% from their original shape. They are generally low in cost, making them suitable for large scale manufacturing.

SMPs may include a variety of additives, providing them with additional properties. In one embodiment, the temperature-responsive material is further comprised of carbon nanotubes, short carbon fibers, carbon black, or metallic nanoparticles and powders, which can increase their thermal and electrical conductivity.

In one embodiment, the temperature-responsive material is a shape-memory alloy (SMA). Example SMAs include copper-zinc-aluminum alloys, copper-aluminum-nickel alloys, and nickel-titanium alloys. SMAs can also be created by alloying zinc, copper, gold, iron, and other elements.

SMAs have at least two solid phases, a martensite phase and an austenite phase. The martensite phase is invoked at temperatures below the transformation temperature and permits deformation from an original shape to a deformed shape through mechanical stress. The austenite phase is invoked upon the application of heat at or above a transformation temperature and causes the SMA to return to the original shape.

SMAs may have a wide range of transformation temperatures. Example commercial SMA wires have transformation temperatures of −32° C., −20° C., 0° C., 15° C., 30° C., 40° C., 45° C., 50° C., 60° C., 70° C., 80° C., and 90° C. The transformation temperature can be tailored.

SMAs can provide large displacements and forces, and offer good resistance to oxidation, corrosion, and other forms of degradation. In one embodiment, an electrical charge may stimulate the transformation from the deformed shape to the original shape. In some embodiments, the electrical charge provides heat through resistance, as supplemental heat to reach the transformation temperature.

SMAs are generally denser and more expensive than SMPs. Commercial embodiments are typically in the form of wires, plates, and springs. A custom shape would be more expensive. SMAs provide a relatively lower strain, allowing the material to deform only up to 10%. In some embodiments, the temperature-responsive material is configured in a long formation, like a wire or ribbon, to utilize the change in length. Additionally, SMAs are electrically conductive, and the administration of an electrical charge would lower the time from the deformed shape to the original shape to less than one second.

In one embodiment, the temperature-responsive material is a Liquid crystalline polymer (LCP) or liquid crystalline elastomer (LCE). LCP/LCEs are shape-memory polymers with additional functionality. Instead of an original shape and a deformed shape, these materials may have at least two kinetically trapped states, which they can transform between solely through a temperature change, or other external stimulus. The transformation can be reversed through a temperature change in the opposite direction. At a lower temperature, the LCP/LCE has one shape, akin to the deformed shape of an SMP/SMA. At a higher temperature, the LCP/LCE has another shape, akin to the original shape of an SMP/SMA. No deformation through external mechanical force is required. In some embodiments, this reversible property is advantageous, as it may allow a cover to be easily installed, removed, and replaced, to accommodate inspections or repairs to a sprinkler head.

LCPs and LCEs generally have elastic properties and may undergo a significant strain of 50% between states. The transformation temperature, between two states can range from 0° C. to 100° C. In addition to temperature, the external stimulus prompting a state change could be light, an electrical charge, or magnetic field. Additional materials may be combined with the LCP/LCE to create a composite with additional functionalities, to adjust heat conduction, electrical conduction, stiffness, and strain.

In one embodiment, the temperature-responsive material is a material that changes from a solid to a liquid at the transformation temperature. In one embodiment, the material melts away from the apparatus. In these embodiments, the material is comprised of a metal or alloy with a particular melting point. An example is solder. Another example is wax.

In another embodiment, the material is encased in another material with a higher melting point. In one embodiment, the temperature-responsive material is contained in a tube. For example, an actuator is formed by encasing solder in a flexible straight plastic tube and cooled below the melting point. The actuator is then bent to create a deformed shape. When the interior solder is melted at a transformation temperature, the tube reverts to its original straight shape.

In another embodiment, the temperature-responsive material is a bimetal. Bimetals are comprised of at least two layers of two metals with different coefficients of thermal expansion. Upon heating, one metal expands more than the other, causing the bimetal to change shape. This converts the temperature change into a controlled mechanical displacement.

FIG. 1 shows a top perspective view of one embodiment of a sprinkler cover 101 in its original shape. The cover is a circle, with a flange 102 surrounding the perimeter of the cover. Three actuators 103 are cut into the flange and are curved slightly inward towards the center of the cover. In alternative embodiments, there are one or more actuators. In one embodiment, the entire cover is comprised of temperature-responsive material. In another embodiment, just the actuators are comprised of temperature-responsive material. In one embodiment, the temperature-responsive material is an SMP.

Figure 2:
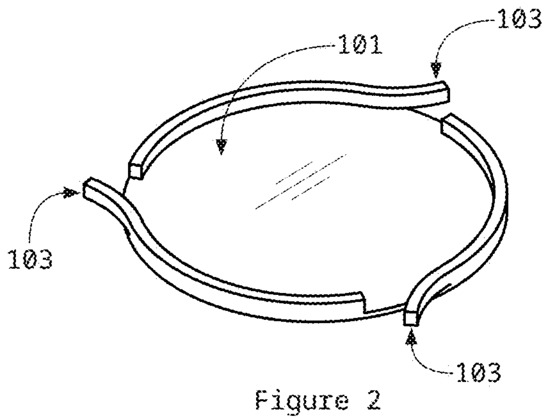
FIG. 2 shows a top perspective view of one embodiment of a sprinkler cover in its deformed shape.

FIG. 2 shows a top perspective view of one embodiment of the sprinkler cover 101 in its deformed shape. The actuators 103 are curved slightly outwards.

Figure 3:
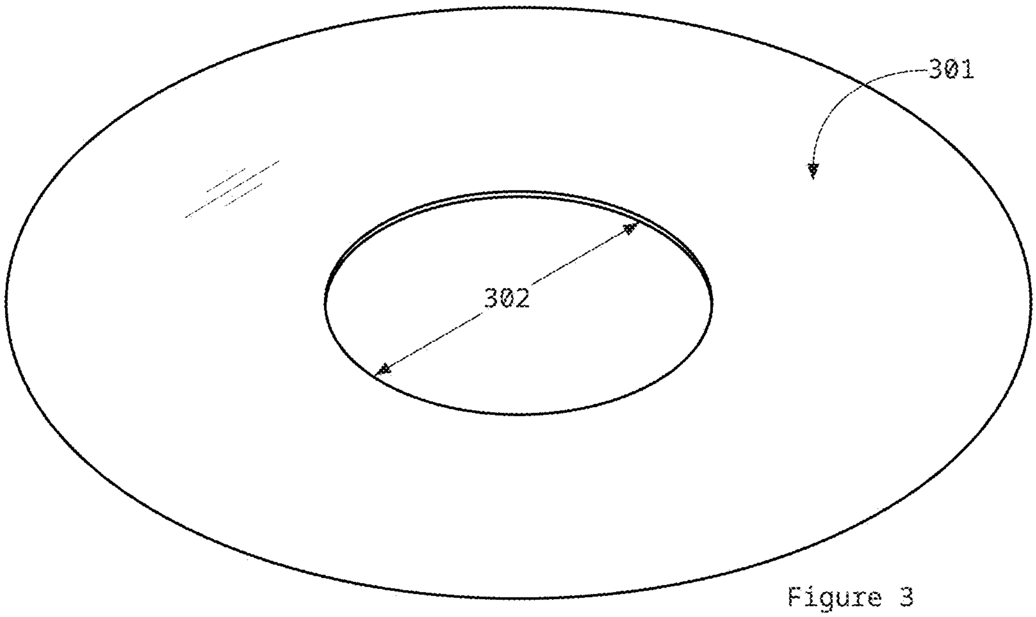
FIG. 3 shows a top perspective view of one embodiment of a sprinkler collar.

FIG. 3 shows a top perspective view of one embodiment of a sprinkler collar 301. The sprinkler cover is a thin sheet of material with an aperture 302 for holding the cover. The collar 301 will be applied to a ceiling, or other surface. In one embodiment, the collar 301 is comprised of a rigid lightweight material.

Figure 4:
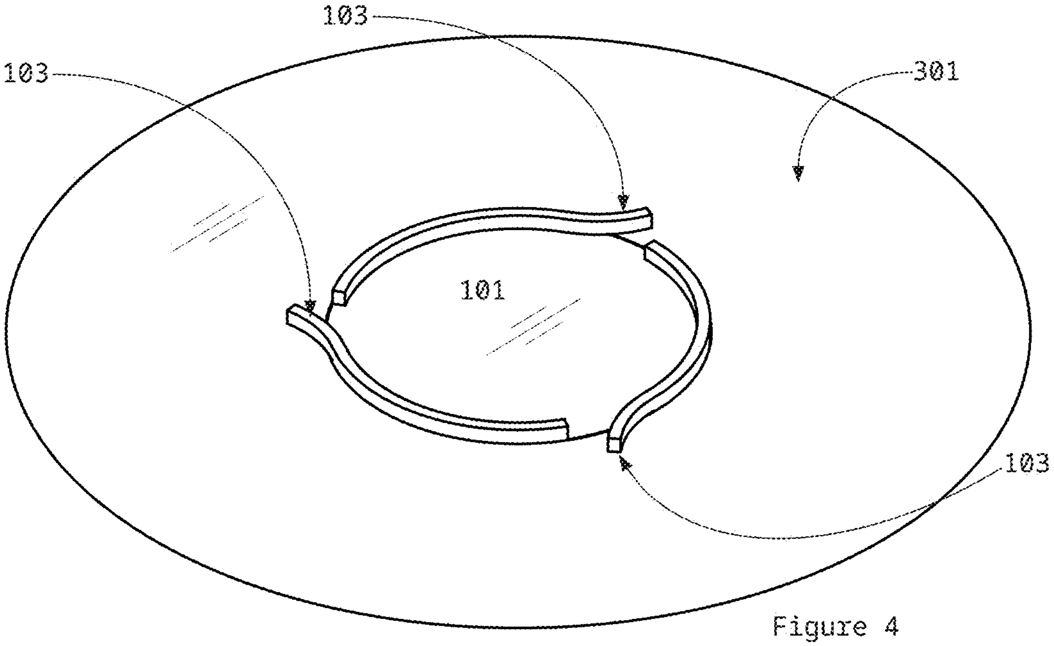
FIG. 4 shows a top perspective view of one embodiment of a sprinkler cover in its deformed shape installed in a collar.

FIG. 4 shows a top perspective view of one embodiment of a sprinkler cover 101 in its deformed shape installed in a collar 301. The actuators 103 are slightly bent outward to hold the cover 101 in place within the aperture 302 of the collar 301. Some embodiments are designed for easy removal and replacement, to facilitate inspection of a sprinkler head. Embodiments with three actuators may be inserted into, and removed from, the aperture 302 while in their deformed shape. Other embodiments may require the cover is in its original shape for installation and removal. Through the application of heat, or another stimulus, the cover can be transformed into its deformed shape after insertion, or transformed into its original shape before removal.

Figure 5:
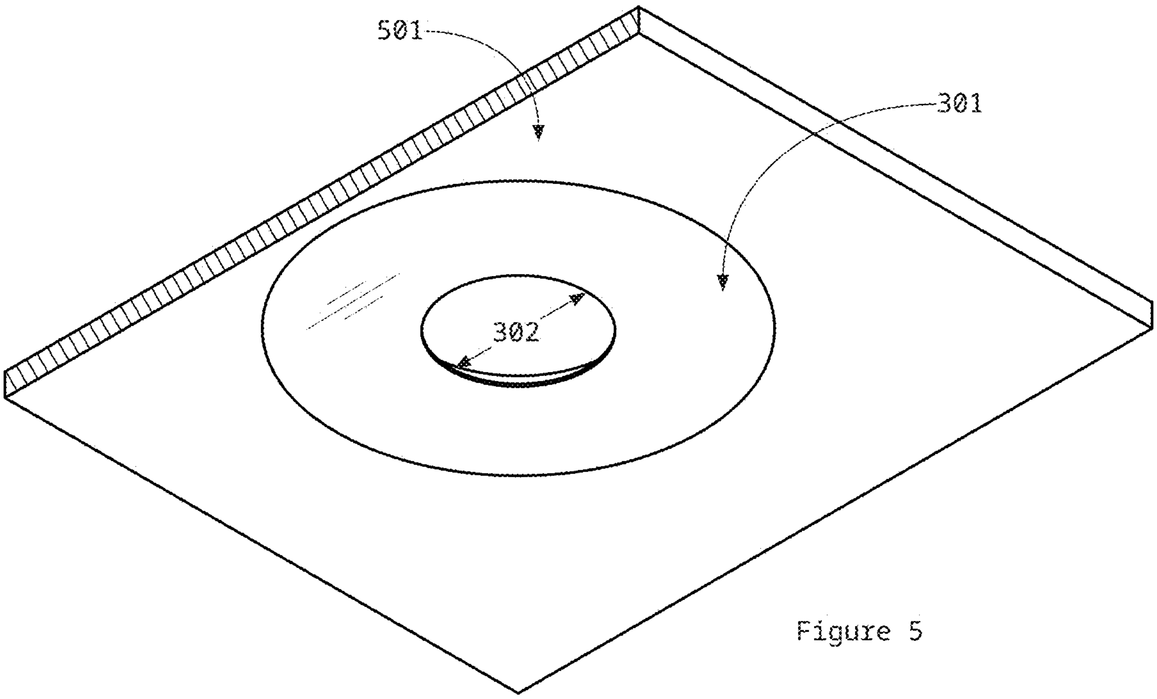
FIG. 5 shows a bottom perspective view of one embodiment of a sprinkler collar installed below an opening.

FIG. 5 shows a bottom perspective view of one embodiment of the sprinkler collar 301 installed below an opening in a ceiling. The thin sheet of the collar 301 provides a nearly uniform surface with the ceiling 501. In one embodiment, the ceiling is comprised of gypsum. In an alternative embodiment, the ceiling is comprised of metal panels. In another embodiment, the ceiling is comprised of acoustic tiles. In another embodiment, the ceiling is comprised of wood tiles. Other ceiling materials capable of supporting a sprinkler cover are envisioned. The aperture 302 allows a sprinkler head to emit water into the room below the ceiling 501.

Figure 6:
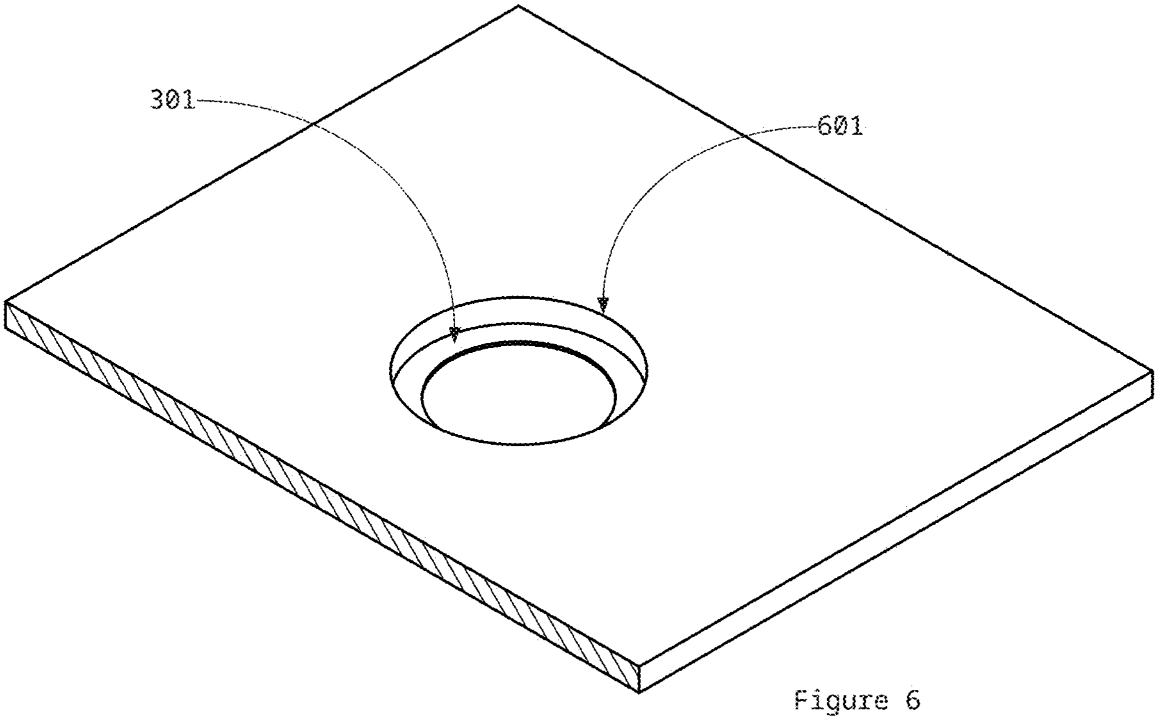
FIG. 6 shows a top perspective view of one embodiment of a sprinkler collar installed below an opening.

FIG. 6 shows a top perspective view of the sprinkler collar 301 installed below an opening 601. The sprinkler collar 301 may be sized to span an opening 601 of any size or shape. This feature aids installation, eliminating the need to cut or drill a precisely located hole to align with a sprinkler head. Instead, a larger hole may be cut to span the location of a sprinkler head.

Figure 7:
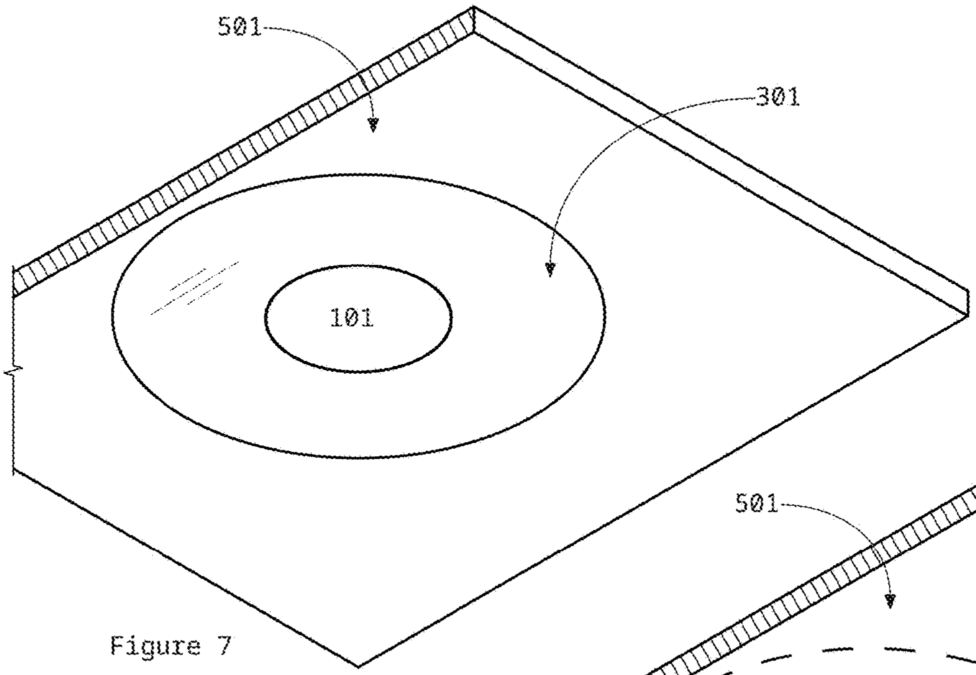
FIG. 7 shows a bottom perspective view of one embodiment of a sprinkler cover and collar installed below an opening.
Figure 8:
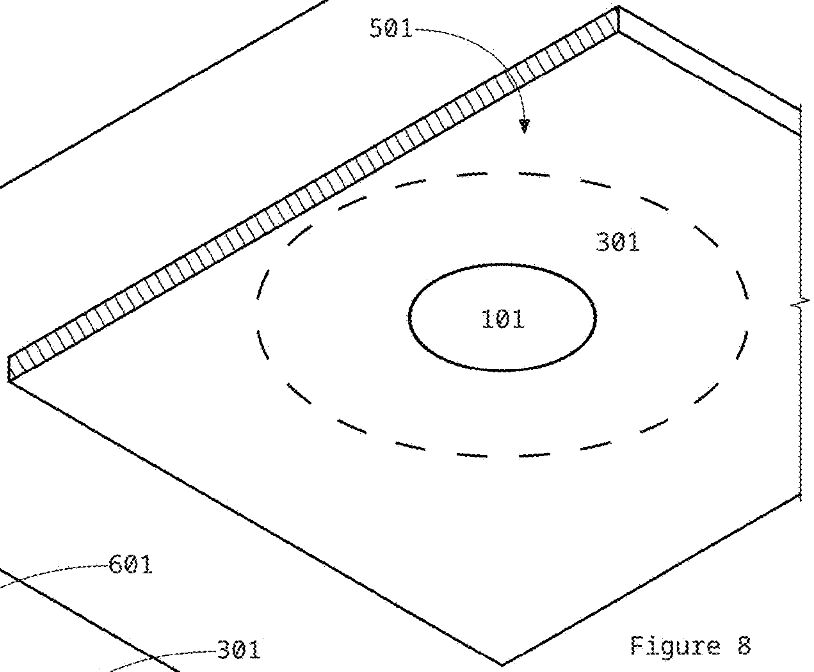
FIG. 8 shows a bottom perspective view of one embodiment of a sprinkler cover and collar installed below an opening, with paint over the sprinkler collar.

FIG. 7 shows a bottom perspective view of one embodiment of the sprinkler cover 101 and collar 301 installed below an opening. The cover 101 and the collar 301 create a smooth surface with the surrounding ceiling 501. FIG. 8 shows a bottom perspective of the sprinkler cover 101 and collar 301 installed below an opening. In this embodiment, the collar 301 is painted to match the surface of the ceiling 501. In some embodiments, the cover 101 is also painted to match the surface of the ceiling 501. The cover 101 is painted before insertion into the aperture 302, leaving a thin gap between the cover 101 and the aperture 302 of the collar 301.

Figure 9:
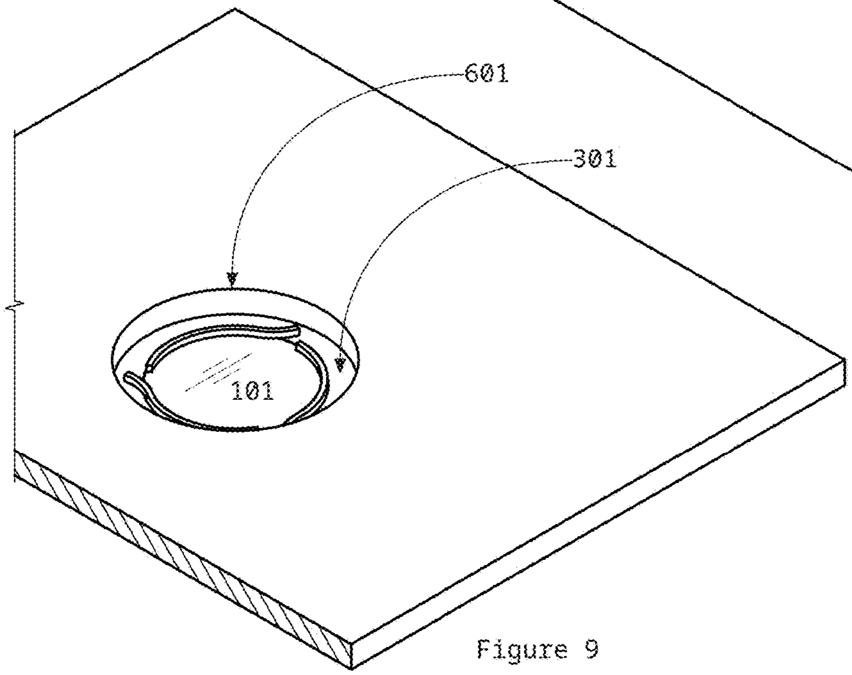
FIG. 9 shows a top perspective view of one embodiment of a sprinkler cover and collar installed below an opening.

FIG. 9 shows a top perspective view of one embodiment of a sprinkler cover 101 and collar 301 installed below an opening 601. The actuators 103 are bent out in the deformed shape, holding the cover 101 in place.

Figure 10:
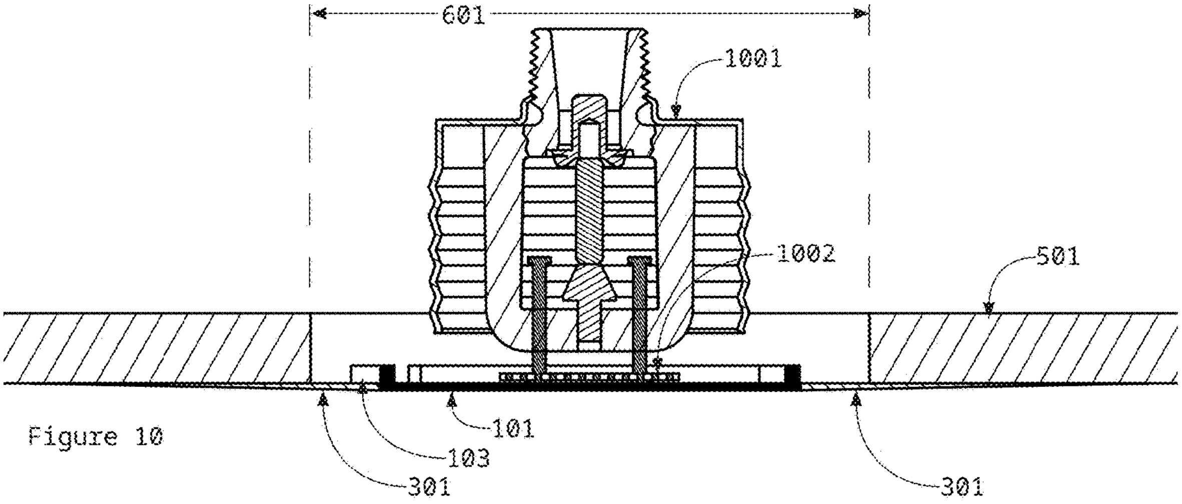
FIG. 10 shows a side section cut of one embodiment of a sprinkler cover and collar installed below an opening.

FIG. 10 shows a side section cut of one embodiment of a sprinkler cover 101 and collar 301 installed below a standard sprinkler head 1001 and ceiling opening 601. In this embodiment, the thinness of the collar 301 is a key feature, intending to create an invisible covering to an observer below the ceiling 501. The sprinkler cover 101 is in the deformed shape. In this view, one bent actuator 103 is visible in the side section cut, holding the cover 101 in place. A deflector 1002 extends from the sprinkler head 1001 down and rests against the top of the cover 101.

Figure 11:
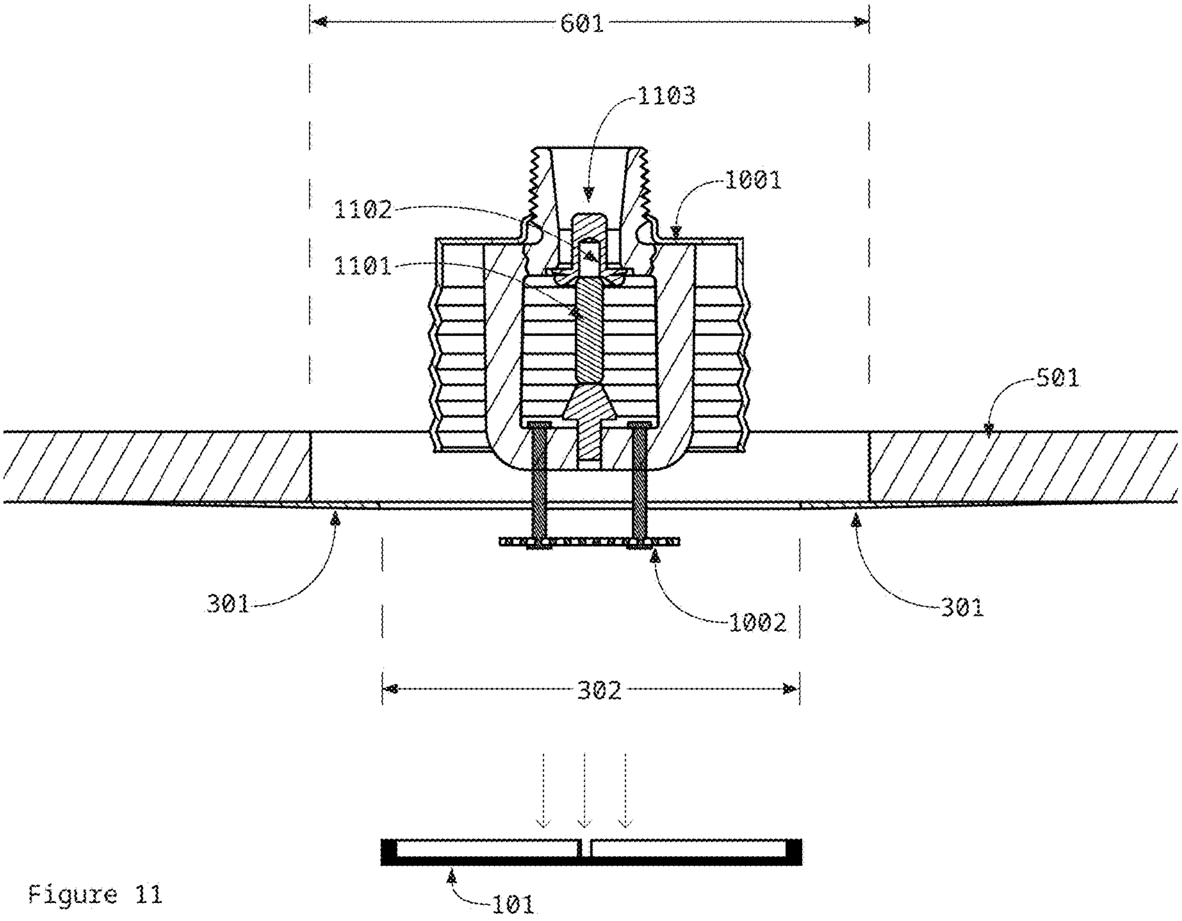
FIG. 11 shows a side section cut of one embodiment of a sprinkler collar installed below an opening, where the cover has fallen away.

FIG. 11 shows a side section cut of one embodiment of a sprinkler collar 301 installed below an opening 601, where the cover 101 has fallen away. When the temperature rises to specified degree, the actuators 103 move, uncovering the aperture and allowing the sprinkler head 1001 to emit water. In this embodiment, the actuators 103 of the cover 101 have reverted to their original shape, as shown in FIG. 1. This allows the cover 101 to fall from the aperture 302, away from the collar 301, exposing the sprinkler head 1001. The three actuators in these embodiments provide three points of temperature sensitivity. When just one actuator responds, reverting to the original shape, the cover will fall away from the opening. Alternative embodiments are further comprised of a spring, which will help push the cover 101 away from the collar 301. Alternative embodiments may include a weighted cover 101 to facilitate falling away.

In one embodiment, the cover 101 is further comprised of a material, such as metal, to facilitate heat conduction to the actuators. Alternative embodiments of the cover 101 are further comprised of air vents to permit heat convection into the aperture 302. If dust or air flow control is a concern, as in a lab or health environment, the apparatus is further comprised of a seal between the cover 101 and collar 301.

This embodiment of a standard sprinkler head 1001 operates with a temperature-responsive material 1101 inside a glass bulb, holding a valve 1102 in the closed position. When a certain temperature is reached, the temperature-responsive material 1101 expands, breaking the glass and opening the valve 1102, releasing water through spout 1103. The deflector plate 1002 drops as the cover 101 falls away, the water leaving the spout 1103 hits the deflector plate 1002, where it is dispersed laterally below the surface of the ceiling 501. In some embodiments, the cover actuator responds to a temperature below the activation temperature of the temperature-responsive material holding the valve 1102 closed, ensuring that the cover 101 exposes the aperture 302 before the sprinkler head is activated and emits water.

Figure 12:
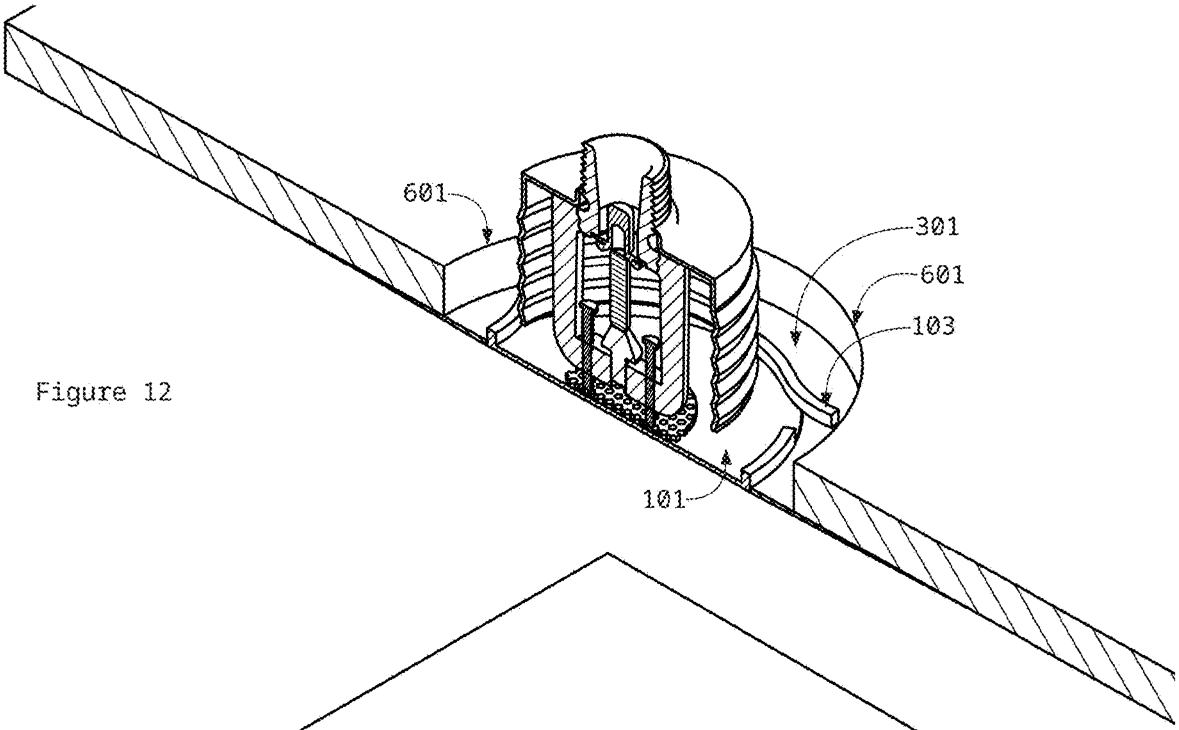
FIG. 12 shows a top perspective section cut view of one embodiment of a sprinkler cover and collar installed below an opening.
Figure 13:
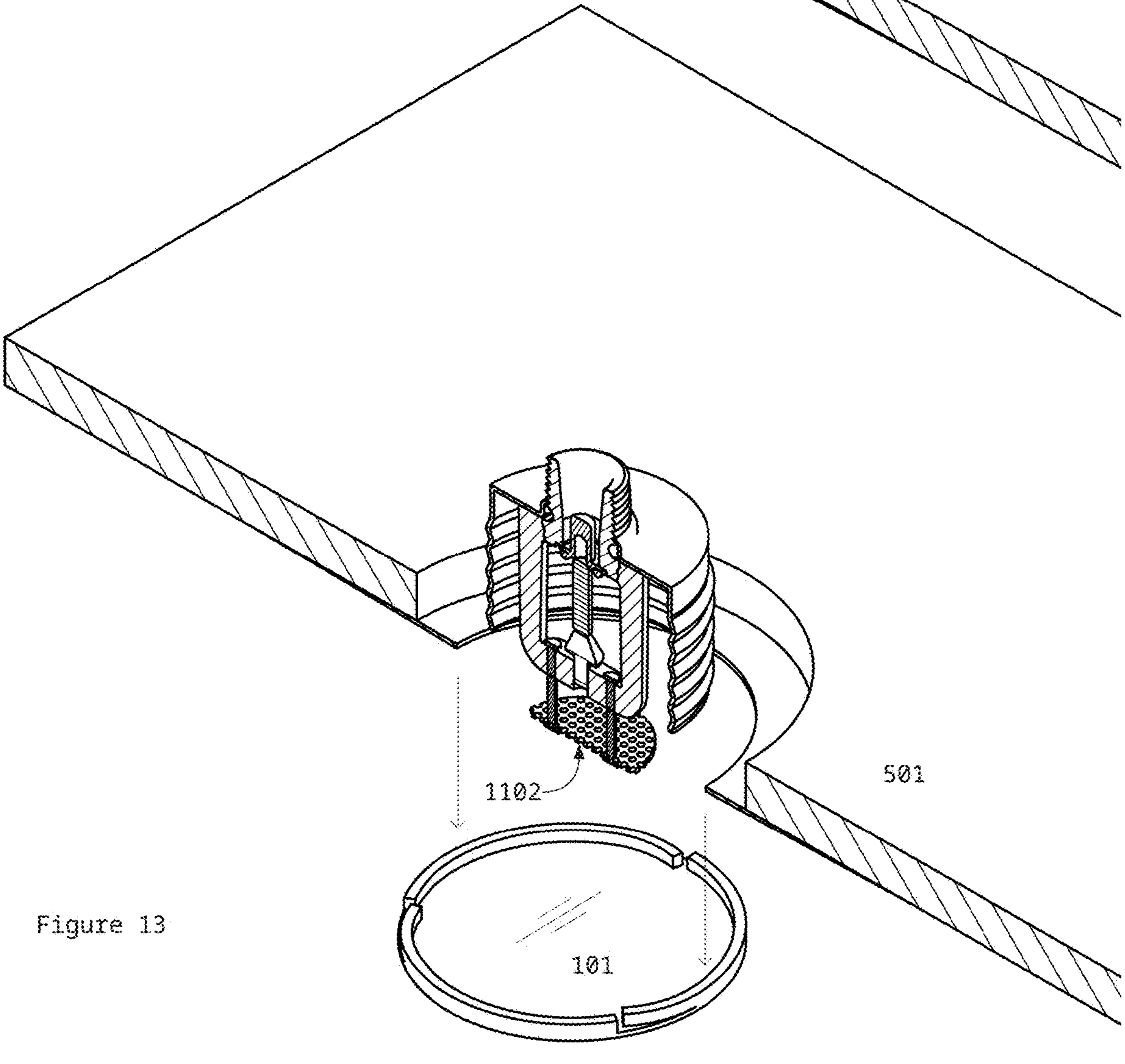
FIG. 13 shows a top perspective section cut view of one embodiment of a sprinkler collar installed below an opening, where the cover has fallen away.

FIG. 12 shows a top perspective section cut view of one embodiment of a sprinkler cover 101 and collar 301 installed below a ceiling opening 601. The actuators 103 are bent outwards in the deformed shape, holding the cover 101 in place. FIG. 13 shows cover 101 falling away when a transformation temperature is reached, allowing the sprinkler deflector plate 1002 to fall below the surface of the ceiling 501.

Figure 14:
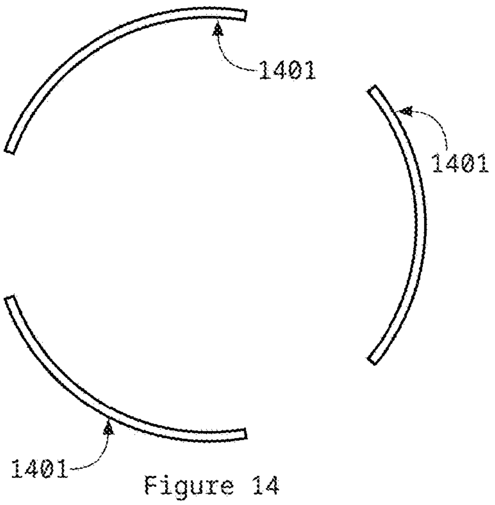
FIG. 14 shows a top view of one embodiment of three actuators in their original shape for a sprinkler cover.
Figure 15:
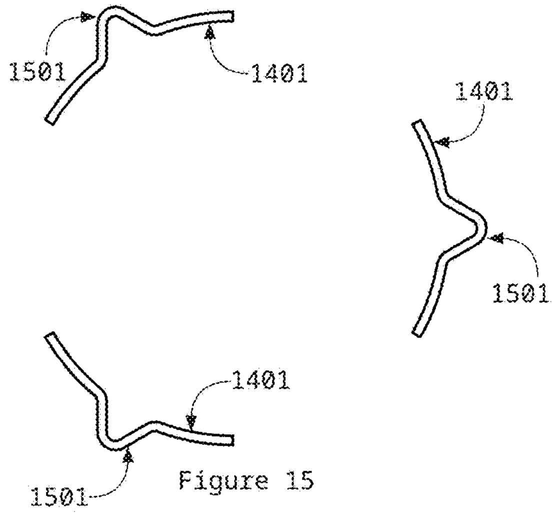
FIG. 15 shows a top view of one embodiment of three actuators in their deformed shape for a sprinkler cover.

FIG. 14 shows a top view of one embodiment of three arced-wire actuators 1401 in their original shape for a sprinkler cover. In this embodiment, the actuators 1401 are comprised of temperature-responsive SMA. An alternative embodiment is comprised of SMP. FIG. 15 shows a top view of the three arced-wire actuators 1401 in their deformed shape. Each actuator 1401 has been bent to include a protrusion 1501, which will hold the cover in place to the collar.

Figure 16:
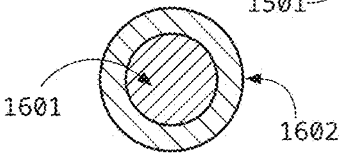
FIG. 16 shows a section cut of one embodiment of an actuator.

FIG. 16 shows a section cut of an alternative embodiment of an actuator. This actuator is comprised of a metal or metal alloy 1601 within an enclosed flexible tube 1602. In this embodiment, the metal or metal alloy is the temperature-responsive material, with a specific melting point. In the original shape, the flexible tube 1602 is relatively straight, similar to the arced-wire actuators 1401 in FIG. 14. The tubes 1602 are filled with the metal or metal alloy 1601 and then bent into a deformed shape similar to FIG. 15. When the temperature reaches the melting point of the metal or metal alloy 1601 melts, permitting the flexible tube 1602 to revert to its original shape.

Figure 17:
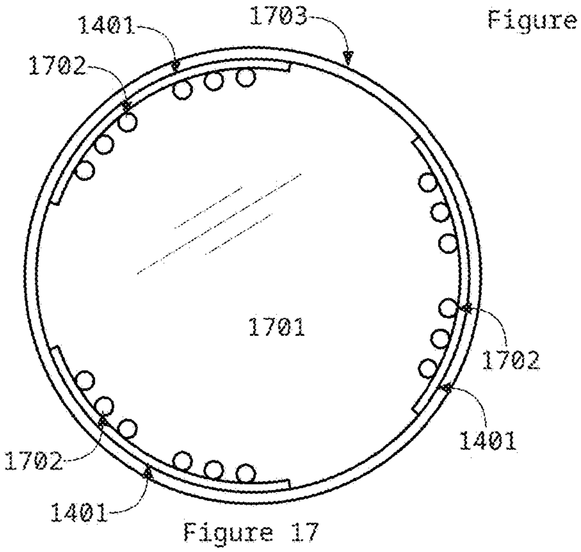
FIG. 17 shows a top view of one embodiment of three actuators in their original shape installed in a sprinkler cover.
Figure 18:
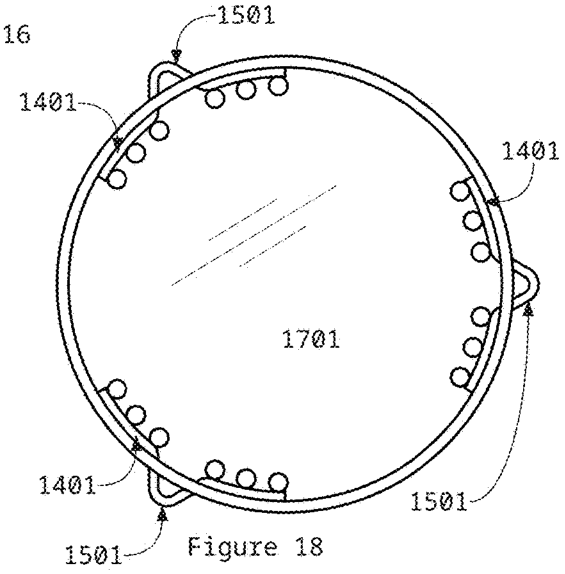
FIG. 18 shows a top view of one embodiment of three actuators in their deformed shape installed in a sprinkler cover.
Figure 19:
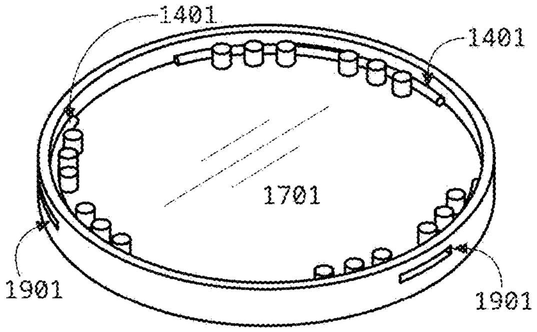
FIG. 19 shows a top perspective view of one embodiment of three actuators in their original shape installed in a sprinkler cover.
Figure 20:
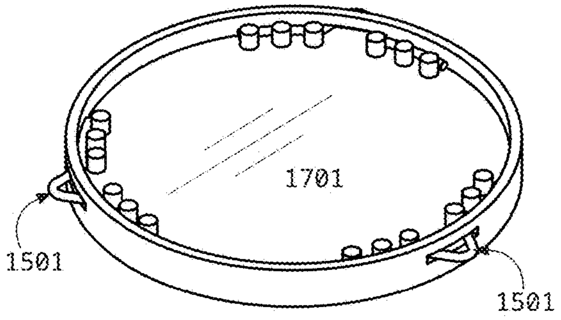
FIG. 20 shows a top perspective view of one embodiment of three actuators in their deformed shape installed in a sprinkler cover.

FIG. 17 shows a top view of one embodiment of three arced-wire actuators 1401 in their original shape installed in a sprinkler cover 1701. The actuators 1401 lie within a channel along the perimeter of the cover 1701, between a series of pins 1702 and a surrounding flange 1703. FIG. 18 shows the three actuators 1401 in their deformed shape installed in the sprinkler cover 1701. The protrusions 1501 of each actuator 1401 extend through the perimeter of the cover 1701. FIG. 19 shows a top perspective view of the three actuators 1401 in their original shape installed in the sprinkler cover 1701. In this embodiment, slots 1901 will permit the protrusions 1501 to extend laterally from the cover 1701. FIG. 20 shows the three actuators in their deformed shape, with the protrusions 1501 extending from the cover 1701. In one embodiment, the cover 1701 is manufactured with the actuators 1401 in their original shape and then deformed prior to installation. In an alternative embodiment, the cover 1701 is manufactured with the actuators in their deformed shape.

Figure 21:
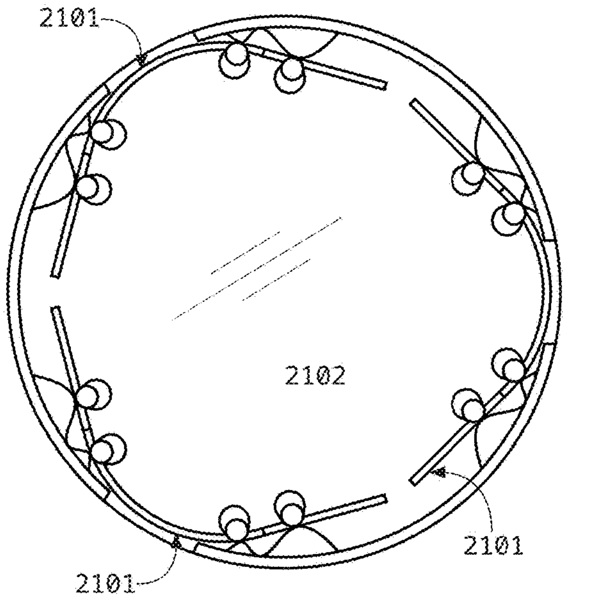
FIG. 21 shows a top view of one embodiment of three actuators in their original shape installed in a sprinkler cover.

FIG. 21 shows a top view of one embodiment of three actuators 2101 in their original shape installed in a sprinkler cover 2102. This embodiment is similar to that shown in FIGS. 14-20, with arced-wire actuators. One embodiment is comprised of SMA. An alternative embodiment is comprised of SMP.

Figure 22:
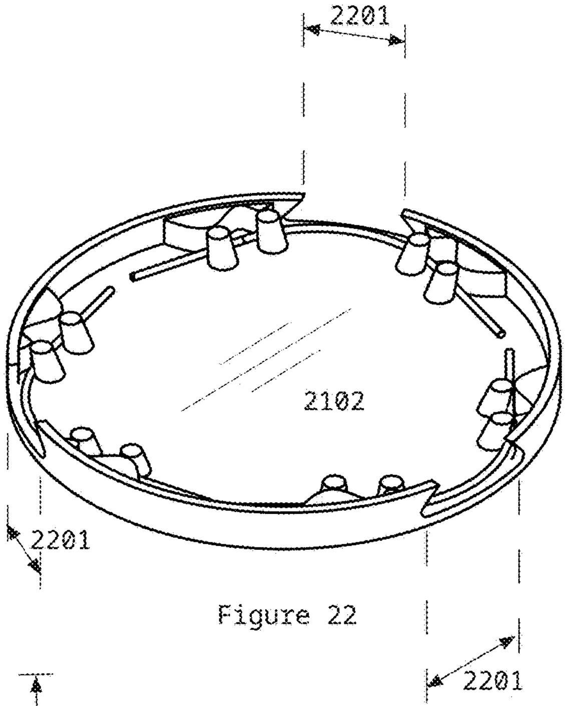
FIG. 22 shows a top perspective view of one embodiment of three actuators in their original shape installed in a sprinkler cover.

In this embodiment, the actuators are configured to minimize friction between the actuators and the cover. Furthermore, the deformation creating protrusions outside of the cover is less pronounced, facilitating the transformation between the deformed shape and the original shape. FIG. 22 shows a top perspective view of this embodiment. In this embodiment, openings 2201 around the perimeter will permit the actuators to extend from the cover 2102 when in their deformed shape.

Figure 23:
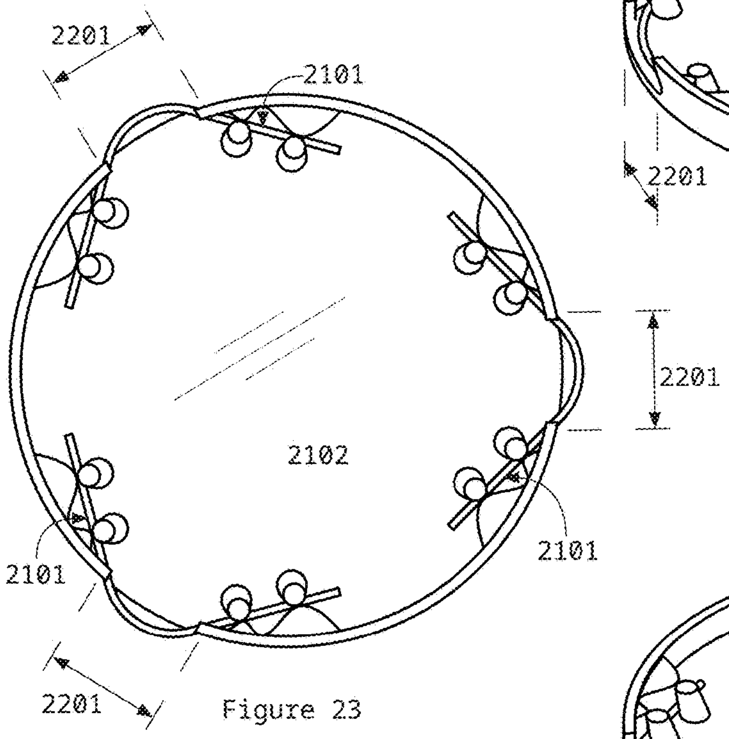
FIG. 23 shows a top view of one embodiment of three actuators in their deformed shape installed in a sprinkler cover.
Figure 24:
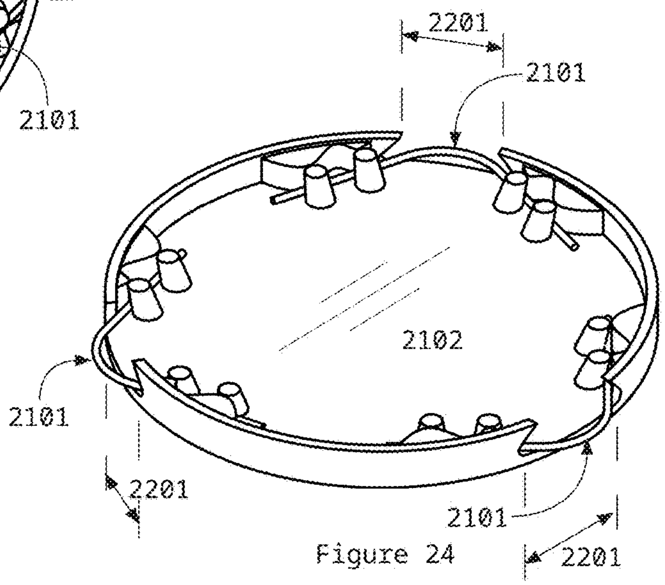
FIG. 24 shows a top perspective view of one embodiment of three actuators in their deformed shape installed in a sprinkler cover.

FIG. 23 and FIG. 24 show a top view, and top perspective view of one embodiment of three actuators 2101 in their deformed shape installed in a sprinkler cover 2102. The actuators 2101 extend from the openings 2201.

Figure 25:
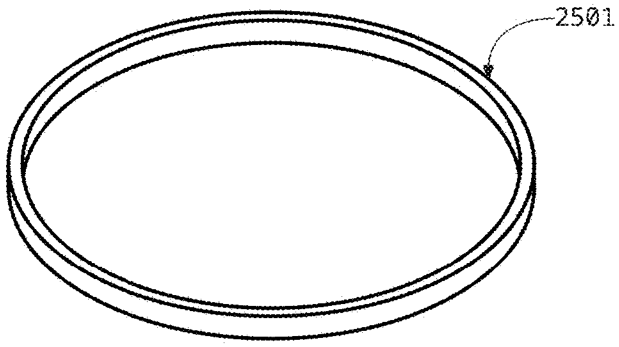
FIG. 25 shows a top perspective view of one embodiment of a ring actuator in its original shape.
Figure 26:
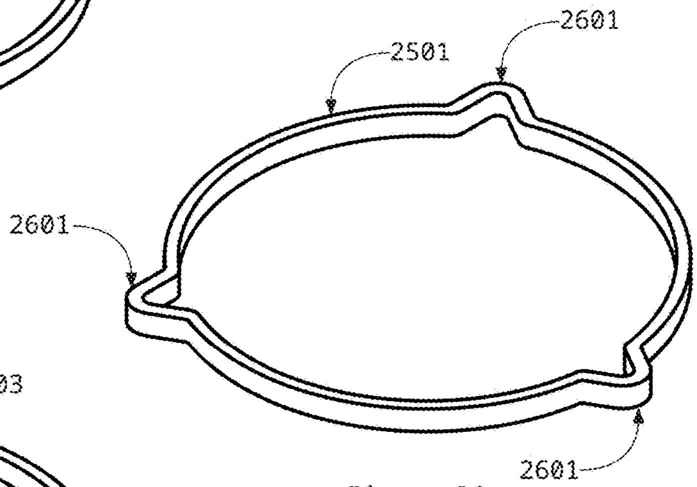
FIG. 26 shows a top perspective view of one embodiment of a ring actuator in its deformed shape.

FIG. 25 shows a top perspective view of one embodiment of a ring actuator 2501 in its original shape. The ring actuator 2501 is comprised of shape memory material. In one embodiment, the ring actuator 2501 is comprised of SMP. An alternative embodiment is comprised of LCP/LCE. FIG. 26 shows a top perspective view of the ring actuator 2501 in its deformed shape, with one or more protrusions 2601.

Figure 27:
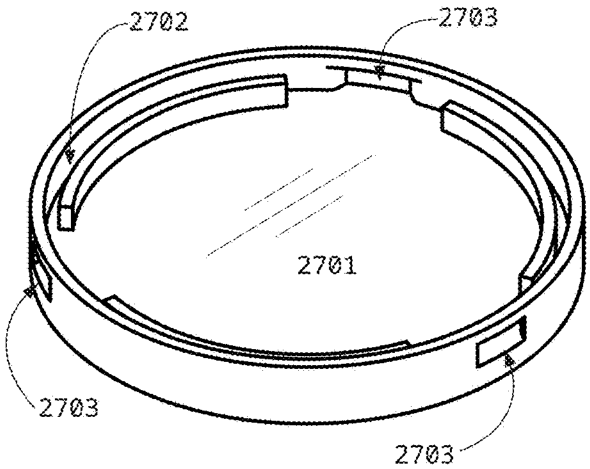
FIG. 27 shows a top perspective view of one embodiment of a sprinkler cover configured to hold a ring actuator.

FIG. 27 shows a top perspective view of one embodiment of a sprinkler cover 2701 configured to hold a ring actuator.

Figure 28:
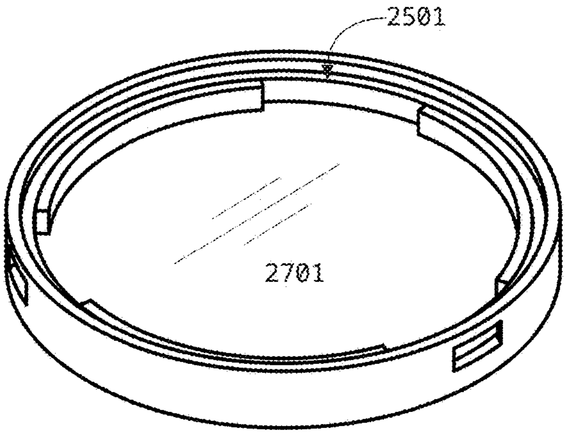
FIG. 28 shows a top perspective view of one embodiment of a sprinkler cover and a ring actuator its original shape.
Figure 29:
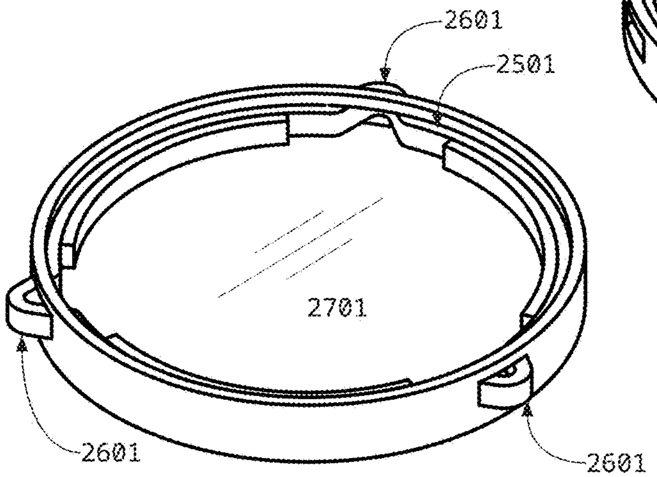
FIG. 29 shows a top perspective view of one embodiment of a sprinkler cover and a ring actuator its deformed shape.

The cover 2701 is configured with a channel 2702 around the perimeter of the cover, to hold the ring actuator 2501. In this embodiment, one or more slots 2703 allow the protrusions to extend from the perimeter of the cover 2701. FIG. 28 shows the sprinkler cover 2701 with the ring actuator 2501 installed in its original shape. FIG. 29 shows the ring actuator 2501 in its deformed shape, with the protrusions 2601 extending through the slots of the cover 2701.

Figure 30:
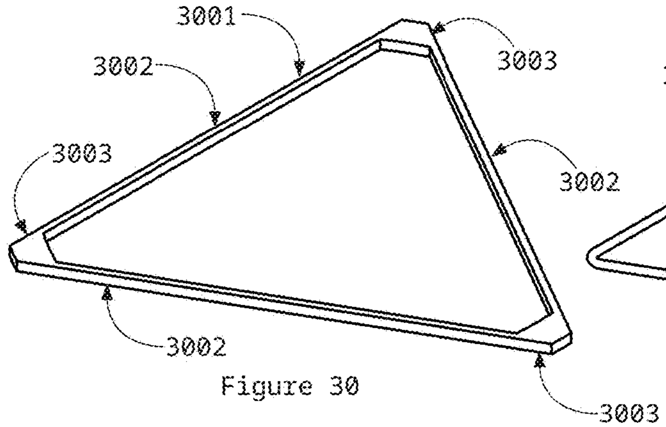
FIG. 30 shows a top view of one embodiment of a triangle actuator comprised of shape memory polymer.
Figure 31:
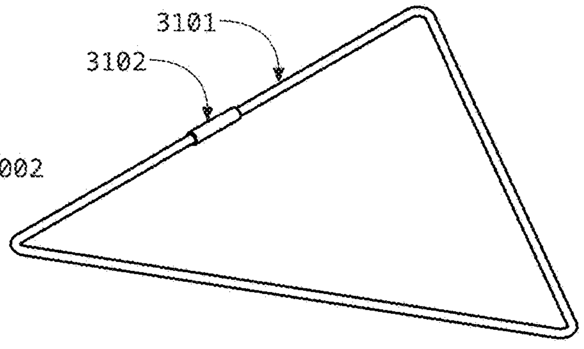
FIG. 31 shows a top view of one embodiment of a triangle actuator comprised of shape memory alloy.

FIG. 30 shows a top view of one embodiment of a triangle actuator 3001 comprised of SMP. An alternative embodiment is comprised of LCP/LCE. The triangular actuator 3001 is comprised of edges 3002 and tongues 3003 at the vertices. Other polygon-shaped actuators are envisioned. FIG. 31 shows an alternative embodiment of a triangle actuator 3101 comprised of SMA. The triangle actuator 3101 may be a single piece around the three edges, with the ends connected by solder or a sleeve 3102 of metal or plastic.

Figure 32:
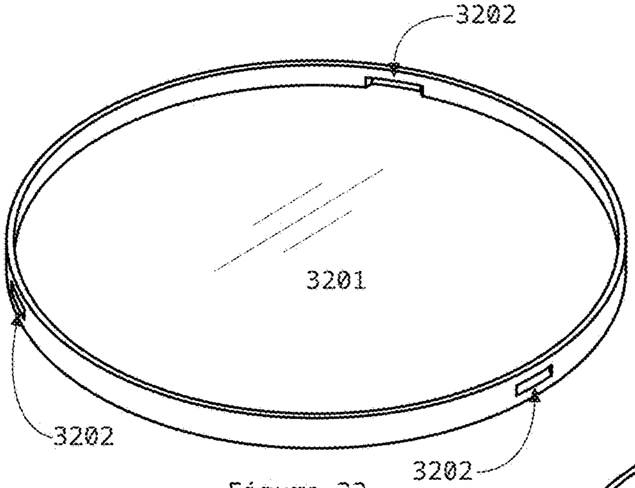
FIG. 32 shows a top perspective view of one embodiment of a sprinkler cover configured to hold a triangle actuator.
Figure 33:
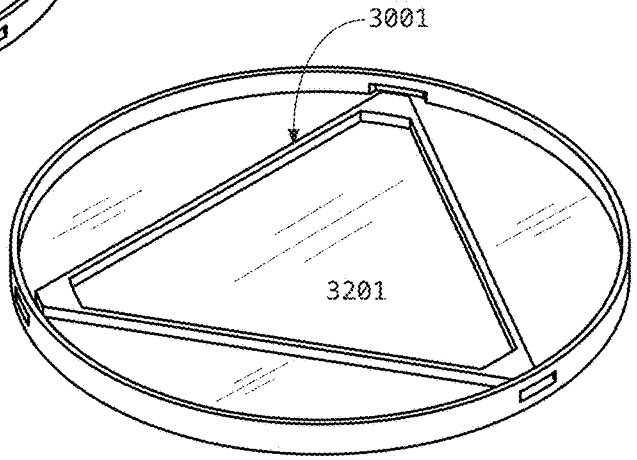
FIG. 33 shows a top perspective view of one embodiment of a sprinkler cover and a triangle actuator its original shape.
Figure 34:
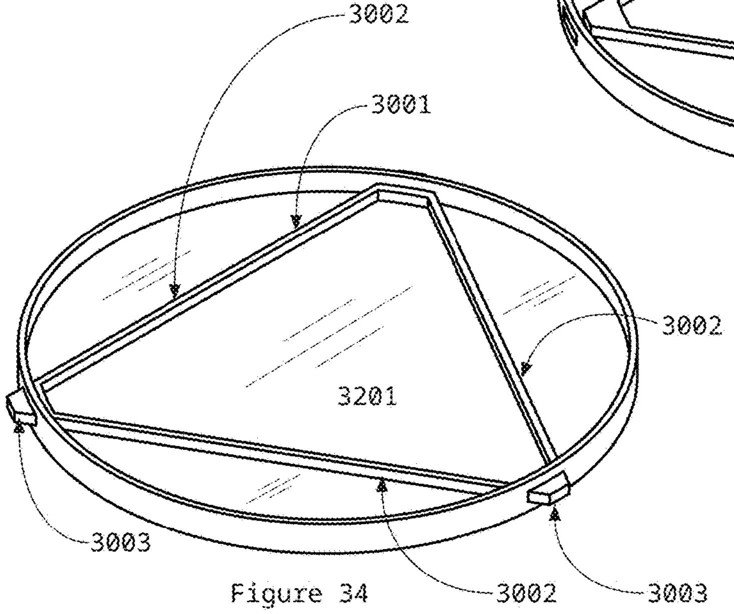
FIG. 34 shows a top perspective view of one embodiment of a sprinkler cover and a triangle actuator its deformed shape.

FIG. 32 shows a top perspective view of one embodiment of a sprinkler cover 3201 configured to hold a triangle actuator. The cover 3201 is configured with three openings, or slots 3202, to allow the vertices of the triangle actuator to extend from the perimeter of the cover 3201. FIG. 33 shows the sprinkler cover 3201 with the triangle actuator 3001 installed in its original shape. FIG. 34 shows the triangle actuator 3001 in its deformed shape, with the tongues 3003 extending through the slots of the cover 3201. In the deformed shape, the edges 3002 of the triangle actuator 3001 are stretched. In the original shape, the edges 3002 retract, pulling the tongues 3003 back.

Figure 35:
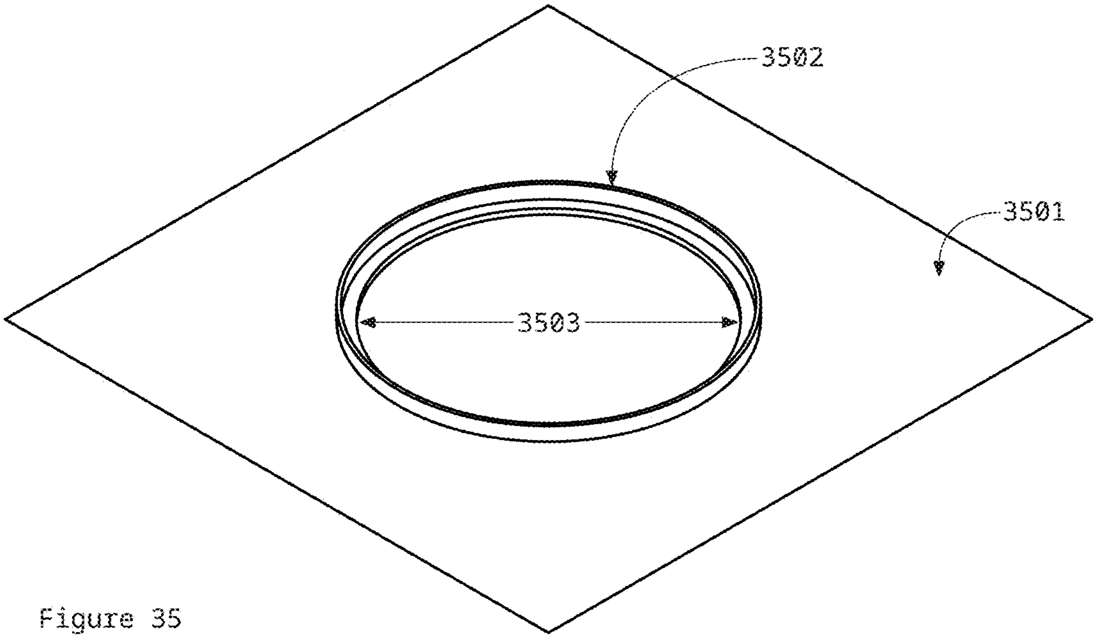
FIG. 35 shows a top perspective view of one embodiment of a sprinkler collar with a structural ring flange around the sprinkler opening.
Figure 36:
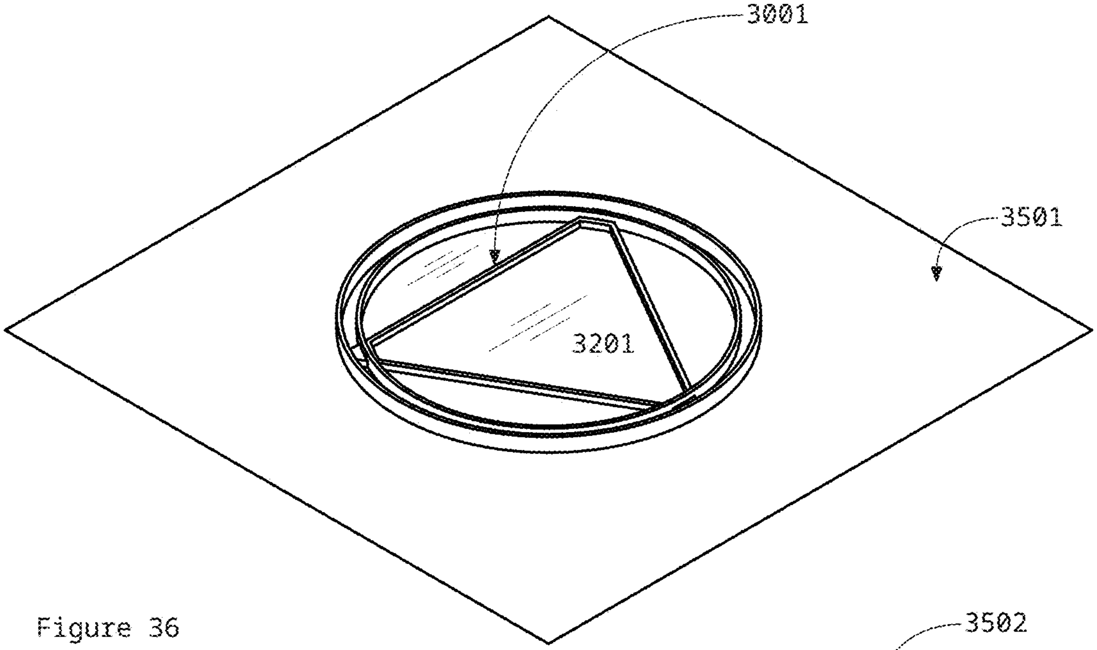
FIG. 36 shows a top perspective view of one embodiment of a sprinkler cover with a triangle actuator installed in a collar with a structural ring flange around the sprinkler opening.

FIG. 35 shows a top perspective view of one embodiment of a sprinkler collar 3501 with a structural ring flange 3502 around the aperture 3503. This embodiment shows a collar 3501 with a square shape. Other shaped collars are envisioned. This embodiment also has a circular aperture 3503. Other shaped apertures are envisioned. A ring flange 3502 provides additional stability to the collar 3501 when spanning a sprinkler head opening. FIG. 36 shows a top perspective view of a sprinkler cover 3201 with a triangle actuator 3001 installed in the collar 3501. The triangle actuator 3001 is in its deformed shape, allowing the tongues to hold it within the aperture of the collar 3501.

Figure 37:
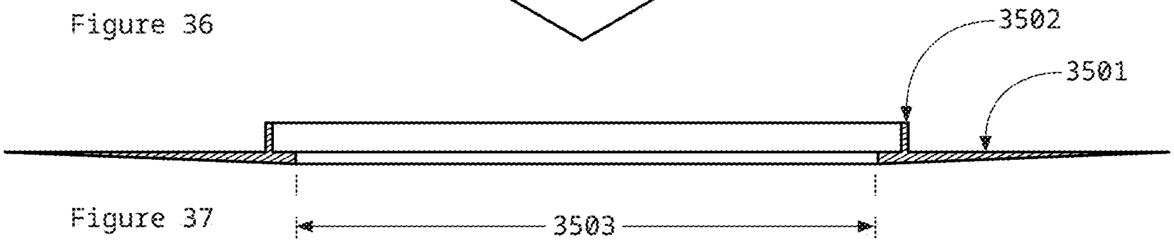
FIG. 37 shows a section cut view of one embodiment of a sprinkler collar with a structural ring flange around the sprinkler opening.
Figure 38:
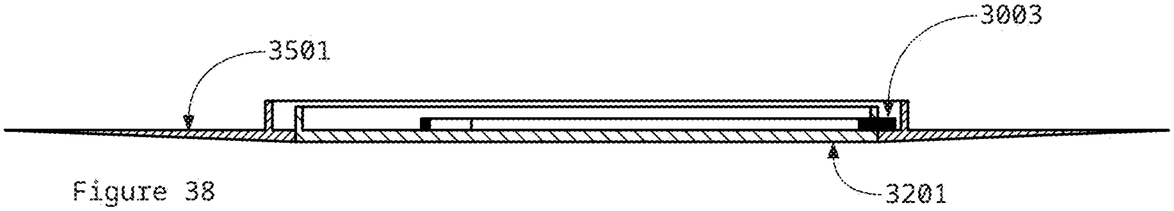
FIG. 38 shows a section cut view of one embodiment of a sprinkler cover and a triangle actuator its deformed shape.

FIG. 37 shows a section cut view of one embodiment of the sprinkler collar 3501 with a structural ring flange 3502 around the aperture 3503. FIG. 38 shows the section cut view with the sprinkler cover 3201 inserted in the aperture of the collar 3501 with the triangle actuator in its deformed shape. The tongues 3003 extend beyond the perimeter of the cover 3201, holding it in place.

Figure 39:
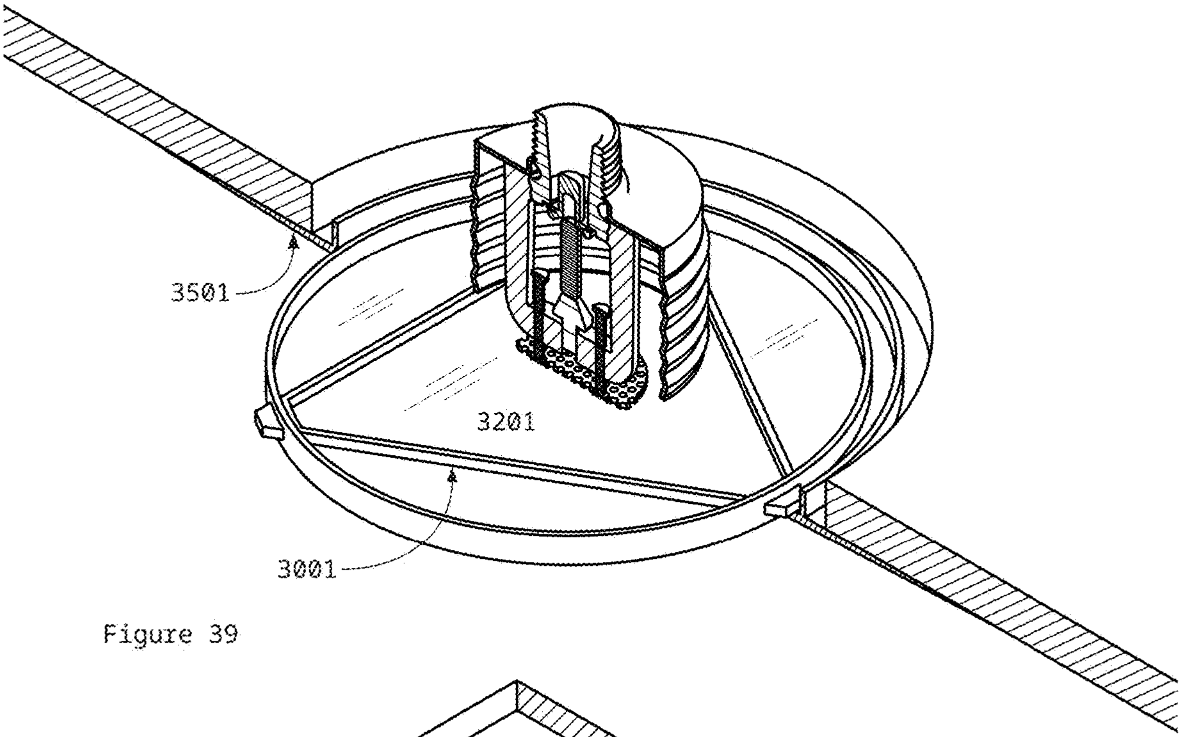
FIG. 39 shows a top perspective section cut view of one embodiment of a sprinkler cover with a triangle actuator and collar installed below an opening.
Figure 40:
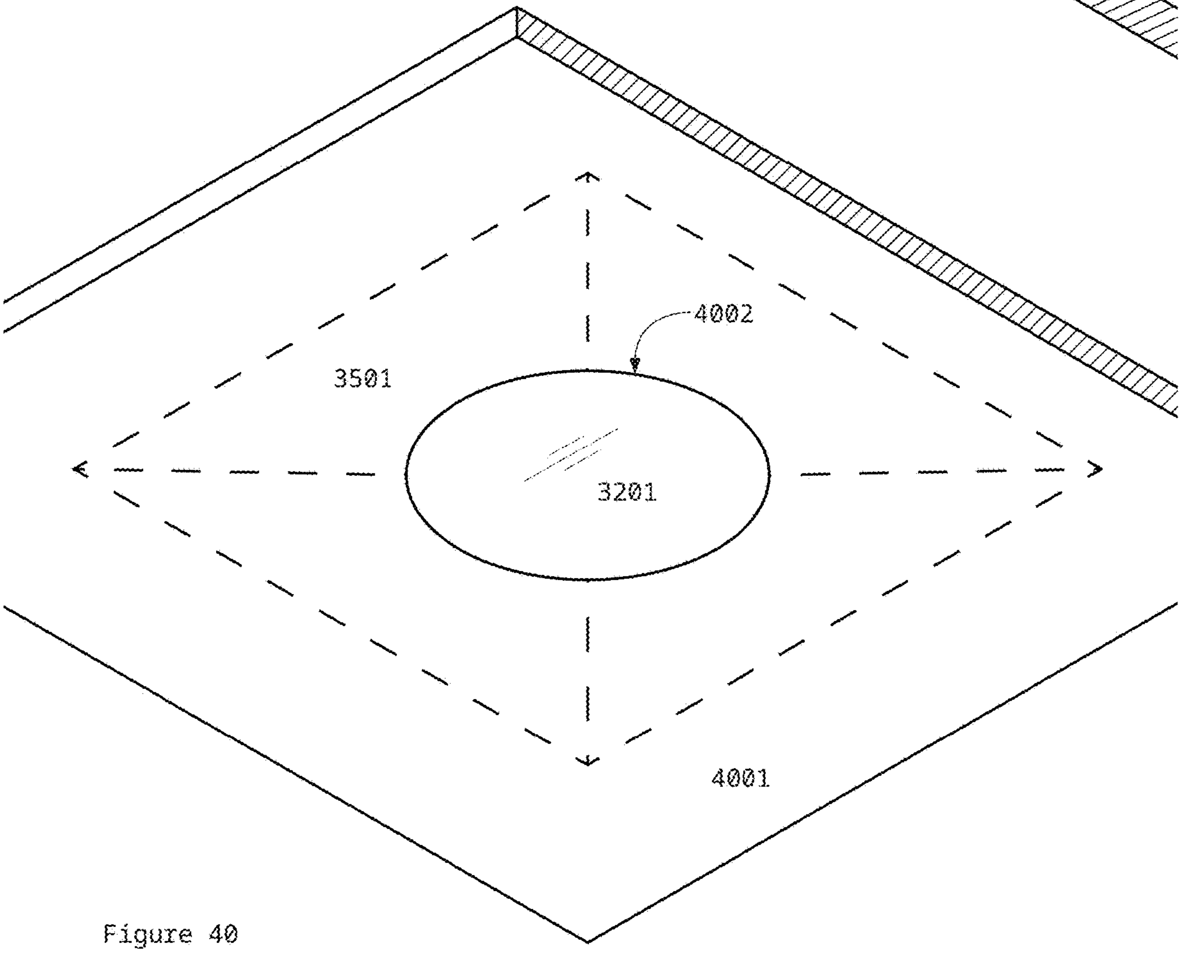
FIG. 40 shows a bottom perspective view of one embodiment of a sprinkler cover with a triangle actuator and collar installed below an opening.
Figure 41:
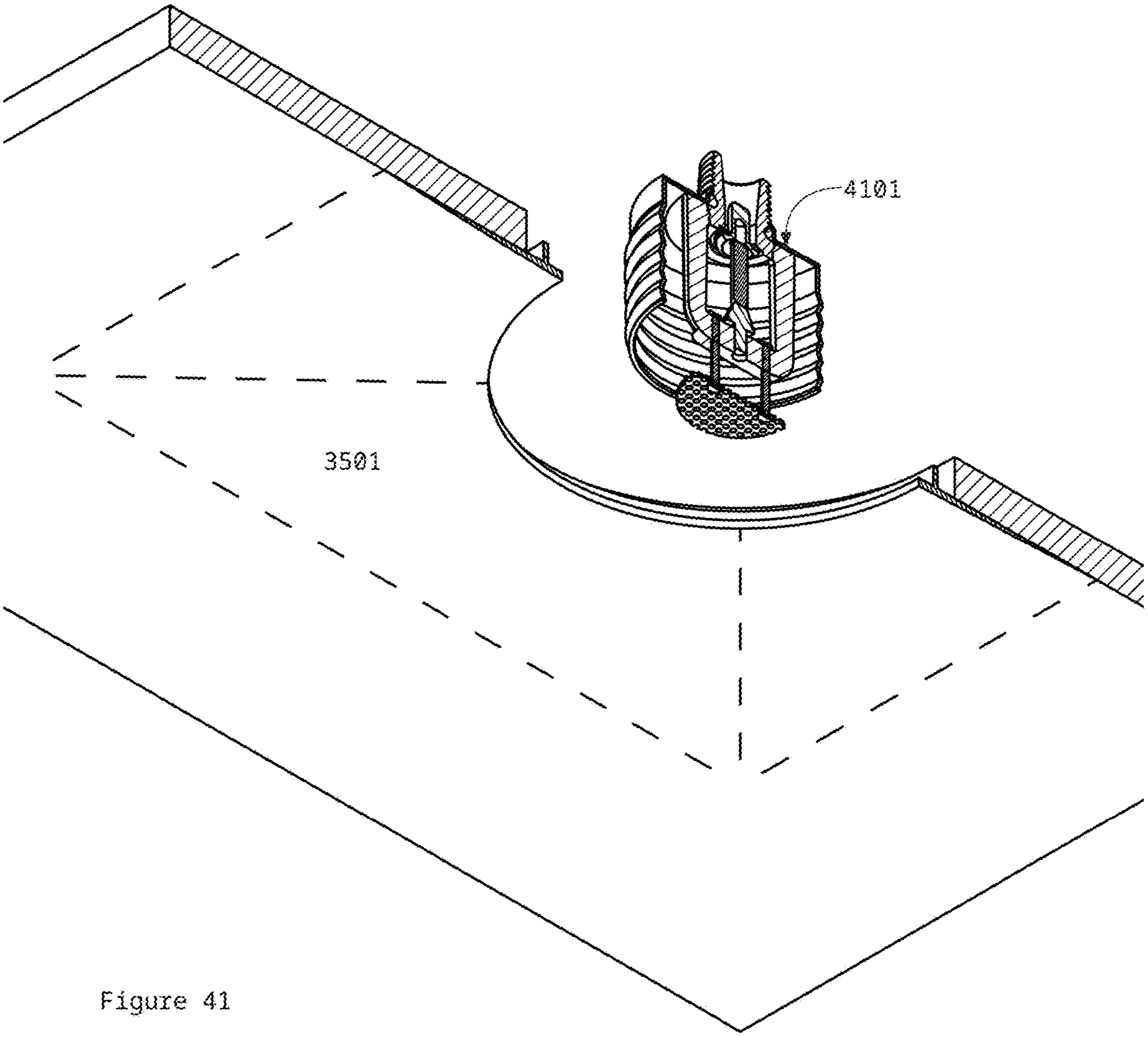
FIG. 41 shows a bottom perspective section cut view of one embodiment of a sprinkler collar with a structural ring flange installed below an opening.

FIG. 39 shows a top perspective section cut view of one embodiment of a sprinkler cover 3201 with a triangle actuator 3001 installed below an opening. The triangle actuator 3001 is in its deformed shape, holding it in place within the aperture of the collar 3501. FIG. 40 shows a bottom perspective view of the sprinkler cover 3201 installed within a square-shaped collar 3501. The collar 3501 is treated to match the surface of the ceiling 4001, making it virtually invisible to a viewer below. Only a slight seam 4002 is visible upon close inspection. FIG. 41 shows a bottom perspective section cut view of the square-shaped sprinkler collar 3501 after a cover has fallen away, permitting the sprinkler head 4101 to emit water down into the room below.

Figure 42:
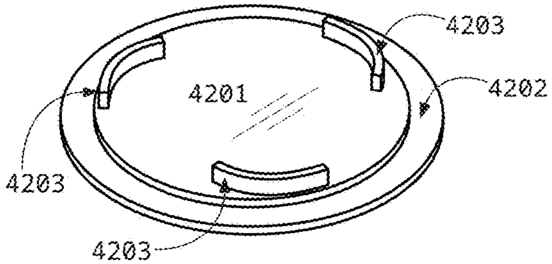
FIG. 42 shows a top perspective view of one embodiment of a sprinkler cover with cover flange in its original shape.

FIG. 42 shows a top perspective view of one embodiment of a sprinkler cover 4201 with a cover flange 4202. In some situations, a pressure differential between the top and bottom sides of the ceiling may cause a cover to become dislodged from the collar. One embodiment solves this problem by including a cover flange 4202, which will secure the flange from an upward force. Alterative embodiments of the apparatus include an air vent in the collar or cover.

Figure 43:
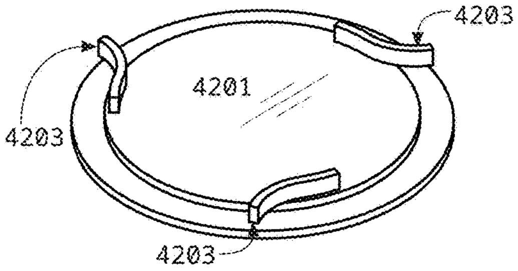
FIG. 43 shows a top perspective view of one embodiment of a sprinkler cover with cover flange in its deformed shape.

FIG. 42 shows the sprinkler cover 4201 with three actuators 4203 in their original shape, curved inward towards the center of the cover 4201. FIG. 43 shows a top perspective view of the sprinkler cover 4201 in its deformed shape, with the actuators 4203 bent slightly outward. In one embodiment, the sprinkler cover 4201 is comprised of SMP. In an alternative embodiment, the sprinkler cover 4201 is comprised of a non-responsive material, but the actuators 4203 are comprised of temperature-responsive material. In one embodiment, the actuators 4203 are comprised of LCP/LCE. An alternative embodiment, the actuators 4203 are comprised of SMA.

Figure 44:
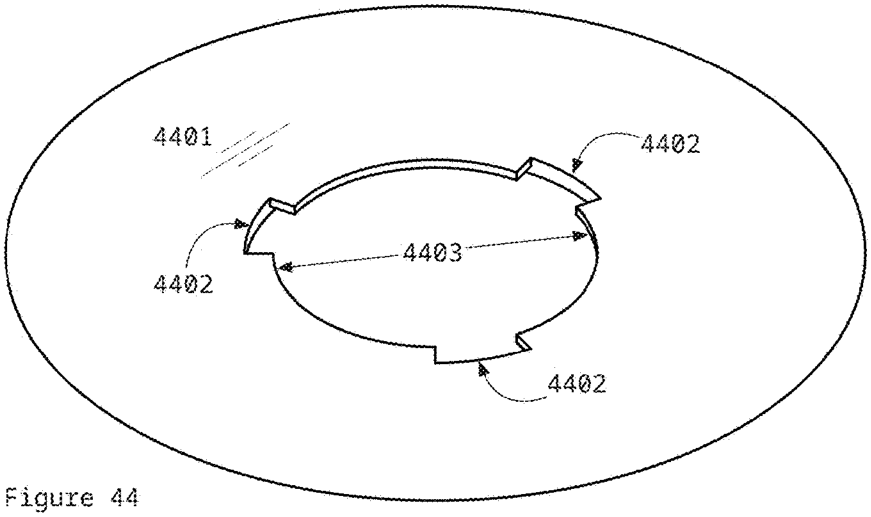
FIG. 44 shows a top perspective view of one embodiment of a sprinkler collar with notches.

FIG. 44 shows a top perspective view of one embodiment of a sprinkler collar 4401 with three notches 4402. Embodiments with one, two, four, or more notches are envisioned. The notches 4402 allow access for the sprinkler cover 4201 to be inserted into the aperture of the collar 4403 while the cover 4201 is in its deformed shape, the actuators 4203 passing through the notches 4402.

Figure 45:
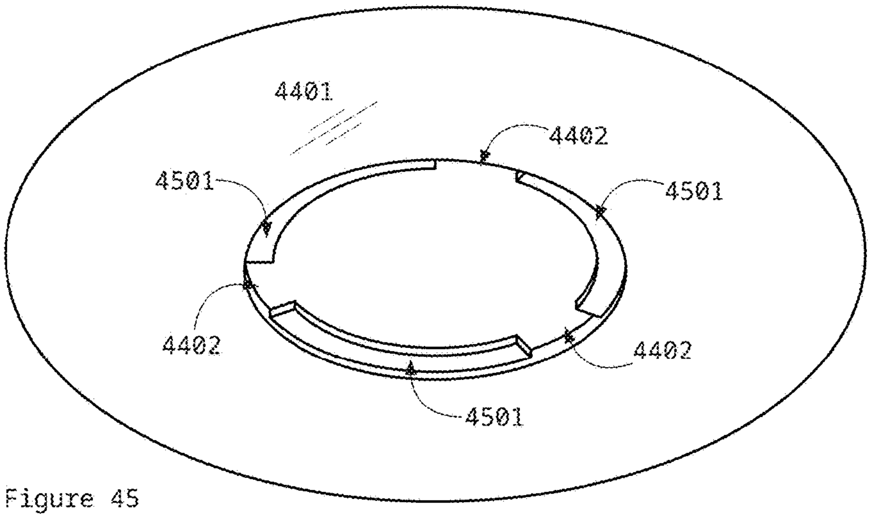
FIG. 45 shows a bottom perspective view of one embodiment of a sprinkler collar with notches.
Figure 46:
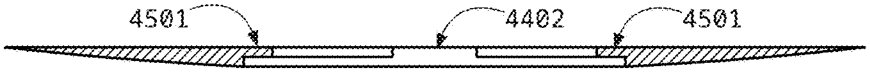
FIG. 46 shows a section cut view of one embodiment of a sprinkler collar with notches.

FIG. 45 shows a bottom perspective view of the sprinkler collar 4401 with notches 4402. Three collar flanges 4501 are shown between the notches. Embodiments with one or more collar flanges are envisioned. The collar flanges 4501 are configured to interface with the cover flange 4202, to hold the cover 4201 in place. FIG. 46 shows a section cut view of the sprinkler collar 4401, demonstrating the collar flanges 4501 and one of three notches 4402.

Figure 47:
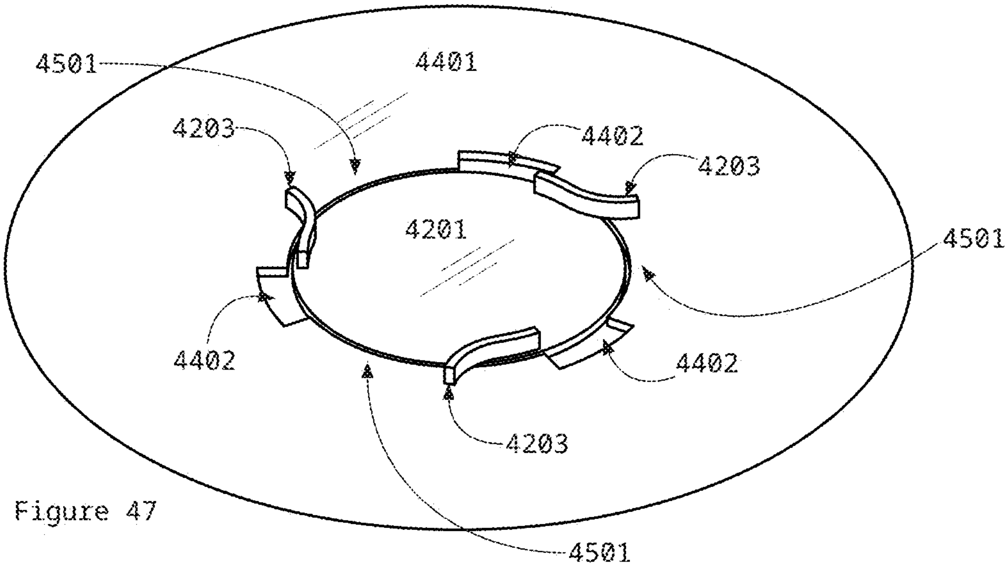
FIG. 47 shows a top perspective view of one embodiment of a sprinkler cover with cover flange in its deformed shape installed in a collar with notches.

FIG. 47 shows a top perspective view of one embodiment of a sprinkler cover 4201 in its deformed shape installed in a collar 4401 with notches 4402. The cover 4201 has been installed within the aperture of the collar 4401. The notches 4402 permitted the actuators 4203 to pass through. The cover 4201 is then rotated so the actuators 4203 rest on the top side of the collar flanges 4501, securing it in place, and preventing movement due to pressure differentials between the air above and below the ceiling.

Figure 48:
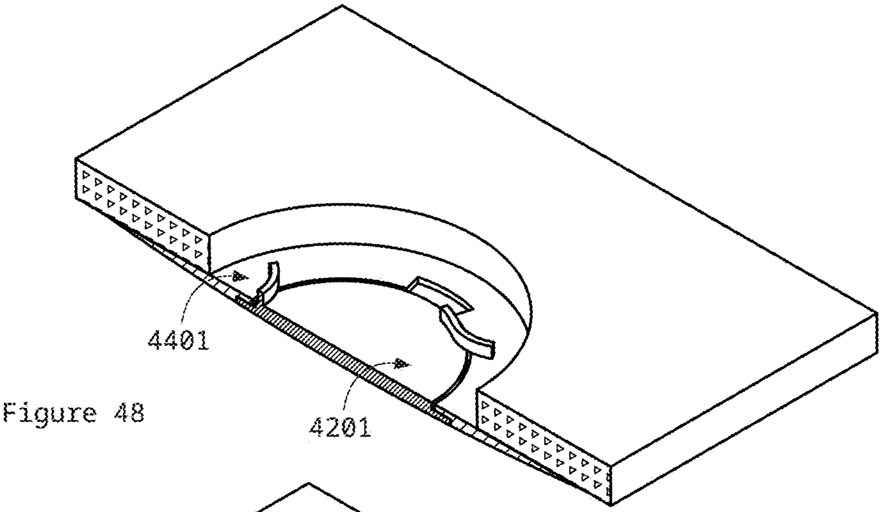
FIG. 48 shows a top perspective section cut view of one embodiment of a sprinkler cover with cover flange in its deformed shape installed in a collar with notches.

FIG. 48 shows a top perspective section cut view of one embodiment of a sprinkler cover 4201 with cover flange in its deformed shape installed in a collar 4401 with notches. This view demonstrates how the actuators 4203 have room to rotate within the sprinkler opening after installation.

Figure 49:
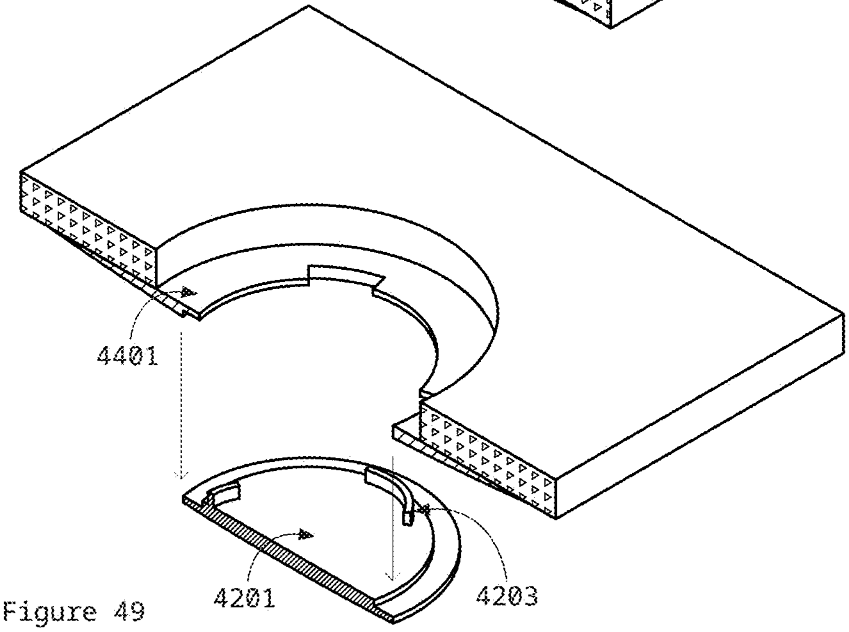
FIG. 49 shows a top perspective section cut view of one embodiment of a sprinkler collar with notches installed below an opening, where a sprinkler cover with cover flange has fallen away.

FIG. 49 shows a top perspective section cut view of one embodiment of a sprinkler collar 4201 with notches installed below an opening, where a sprinkler cover 4201 has fallen away. The temperature rose to a certain level, causing the actuators 4203 to revert to their original shape, bending towards the center of the cover 4201. When the actuators 4203 no longer extend outside the aperture of the collar 4401, the cover 4201 falls under the force of gravity.

Figure 50:
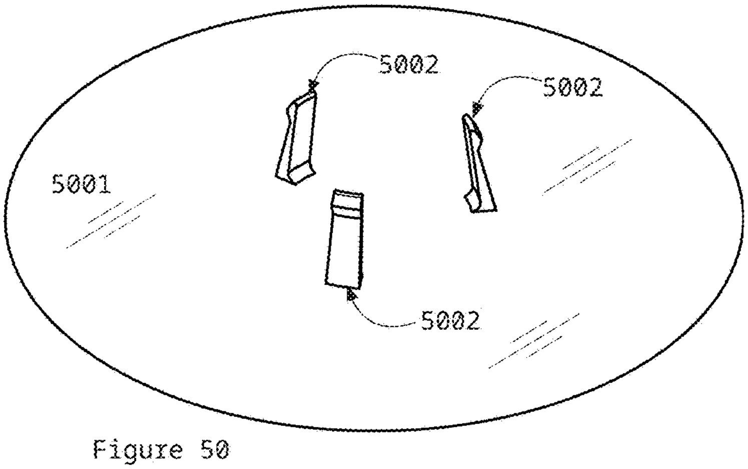
FIG. 50 shows a top perspective view of one embodiment of an insertable sprinkler cover in its original shape.
Figure 51:
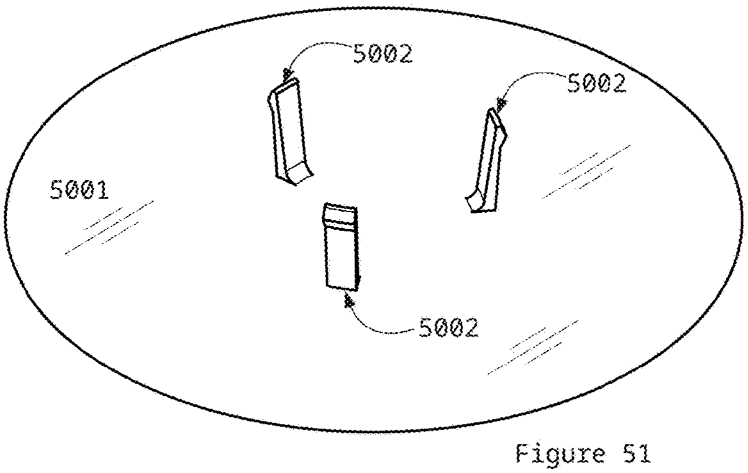
FIG. 51 shows a top perspective view of one embodiment of an insertable sprinkler cover in its deformed shape.

In some embodiments, a single sprinkler cover is used, without the need to attach to a collar. FIG. 50 shows a top perspective view of one embodiment of an insertable sprinkler cover 5001 in its original shape. This embodiment is a flat surface with mounting tabs 5002 extending roughly perpendicular from the surface. In its original shape, the mounting tabs 5002 of the insertable sprinkler cover angled slightly inward. FIG. 51 shows the insertable sprinkler cover 5001 in its deformed shape, with the mounting tabs 5002 angled slightly outward. Embodiments with one or more mounting tabs are envisioned. In one embodiment, the mounting tabs 5002 are the actuators. In one embodiment, the insertable sprinkler cover 5001 is comprised of SMP. In an alternative embodiment, the insertable sprinkler cover 5001 is comprised of LCP/LCE.

Figure 52:
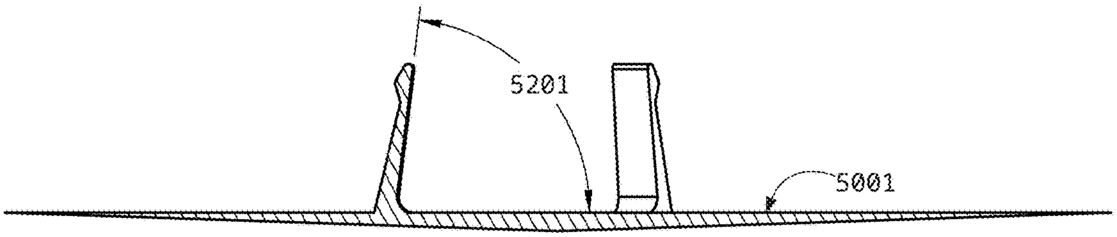
FIG. 52 shows a section cut view of one embodiment of an insertable sprinkler cover in its original shape.
Figure 53:
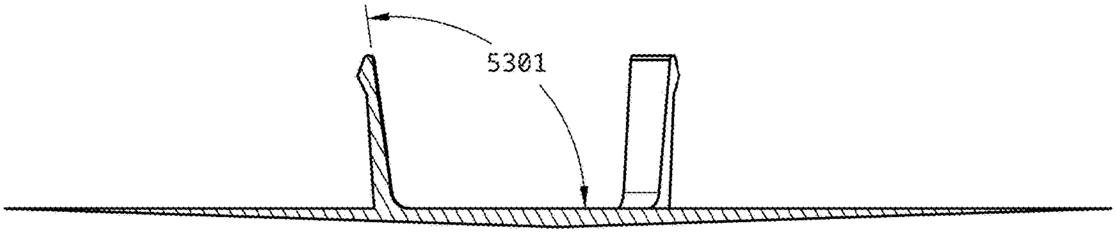
FIG. 53 shows a section cut view of one embodiment of an insertable sprinkler cover in its deformed shape.
Figure 54:
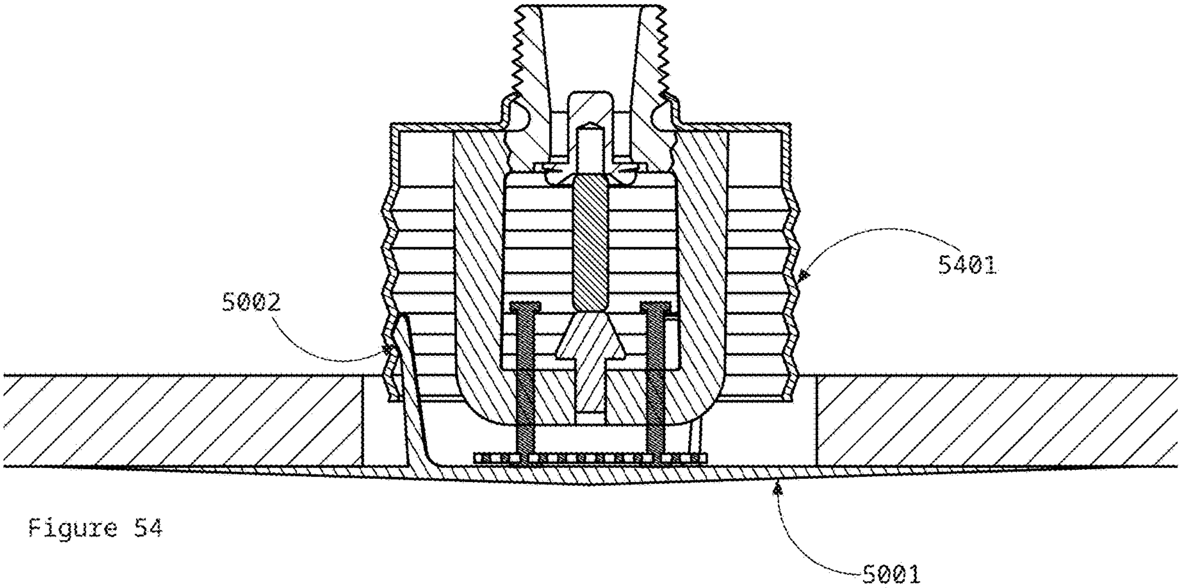
FIG. 54 shows a section cut view of one embodiment of an insertable sprinkler cover installed in an opening.
Figure 55:
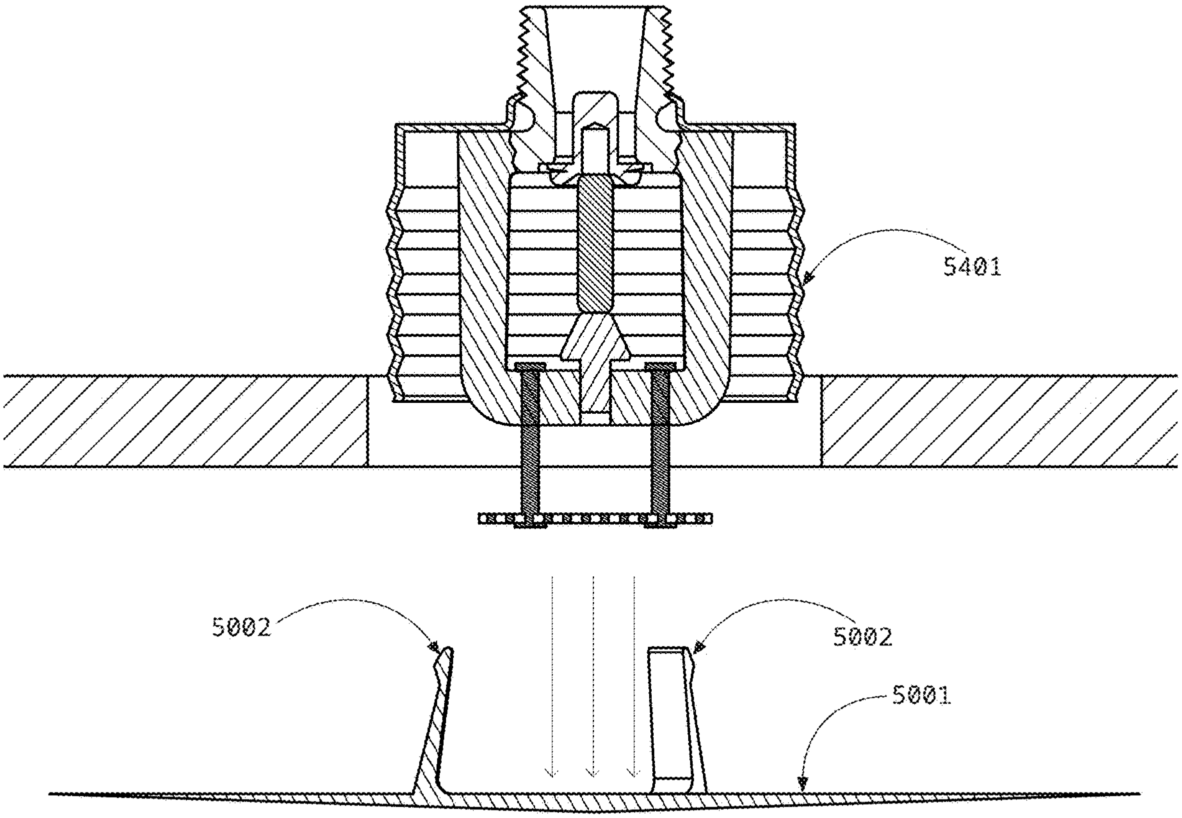
FIG. 55 shows a section cut view of one embodiment of an insertable sprinkler cover having fallen away from an opening.

FIGS. 52 and 53 show section cut views of one embodiment of an insertable sprinkler cover 5001. FIG. 52 shows its original shape. The angle 5201 is slightly acute. FIG. 53 shows its deformed shape. The angle 5301 is slightly obtuse. FIG. 54 shows a section cut view of the insertable sprinkler cover 5001 installed in a standard housing 5401 for a sprinkler head. The mounting tabs 5002 securely grip the interior of the sprinkler support cup 5401 when the insertable sprinkler cover 5001 is in its deformed shape. In one embodiment, the insertable sprinkler cover 5001 is screwed into place. In another embodiment, the insertable sprinkler cover 5001 is pushed into the threaded support cup. As the temperature rises to the specified transformation temperature of the cover's material, the insertable sprinkler cover 5001 reverts to its original shape, the mounting tabs 5002 moving back to their acute angled positions 5201. FIG. 55 shows the insertable sprinkler cover in its original shape. The mounting tabs have angled inward, releasing them from the interior of the sprinkler support cup housing 5401, causing the insertable sprinkler cover 5001 to fall away from the ceiling.

In some embodiments, the entire insertable sprinkler cover 5001 is comprised of temperature-responsive material. In other embodiments, only the mounting tabs 5002 are comprised of temperature-responsive material. In another embodiment, only an area of deformation connecting the mounting tabs 5002 to the flat surface is comprised of temperature-responsive material.

Figure 56:
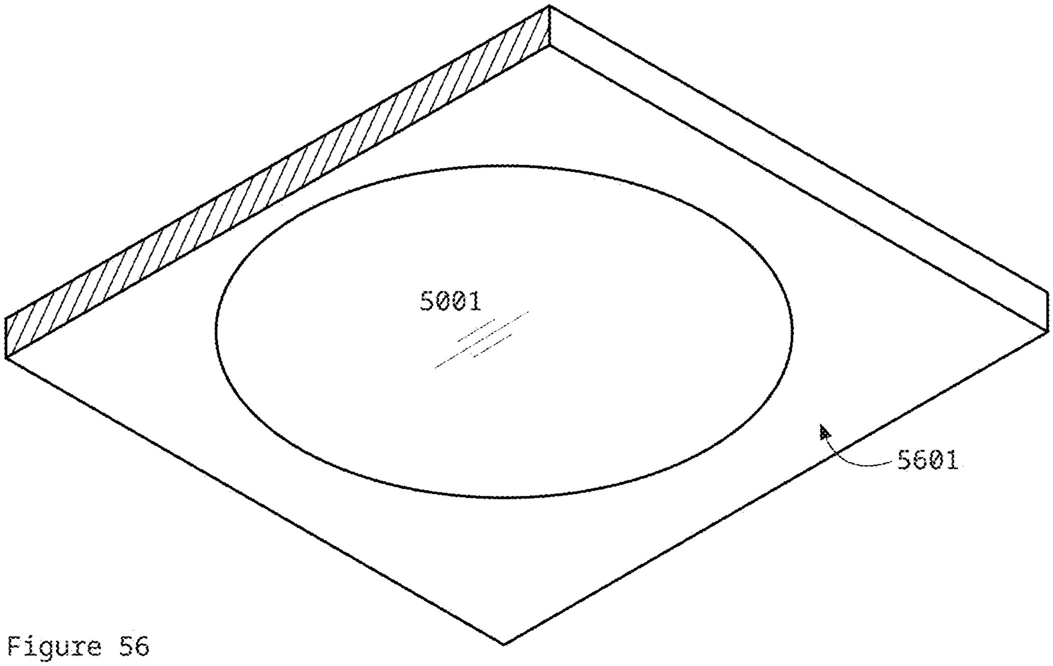
FIG. 56 shows a bottom perspective view of one embodiment of an insertable sprinkler cover installed in an opening.

FIG. 56 shows a bottom perspective view of one embodiment of an insertable sprinkler cover 5001 installed in an opening. The bottom of the insertable sprinkler cover 5001 creates a smooth surface with the ceiling 5601. This embodiment has a round shape, but other shapes are envisioned.

Figure 57:
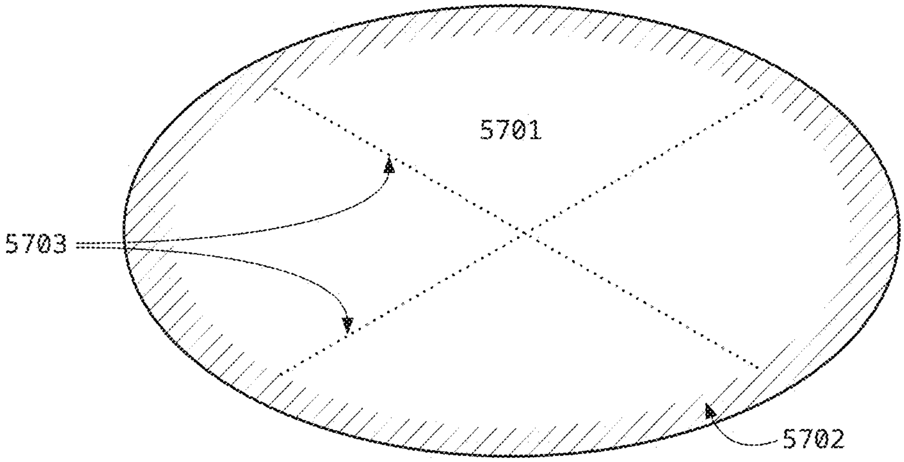
FIG. 57 shows a bottom perspective view of one embodiment of a sheet sprinkler cover in its deformed shape.

FIG. 57 shows a top perspective view of one embodiment of a sheet sprinkler cover 5701 in its deformed shape. This embodiment is sheet of material at least partially comprised of temperature-responsive material. In one embodiment, the sheet sprinkler cover 5701 is comprised of SMP. In an alternative embodiment, the sheet sprinkler cover 5701 is comprised of LCP/LCE.

In some embodiments the sheet sprinkler cover 5701 has an adhesive area 5702 for easy attachment to a surface around a ceiling opening. In some embodiments, the center area of the sheet sprinkler cover is not covered with adhesive.

In one embodiment, the sheet sprinkler cover 5701 is comprised of perforations 5703. In some embodiments the sheet sprinkler cover is circular. Other shaped embodiments are envisioned.

Figure 58:
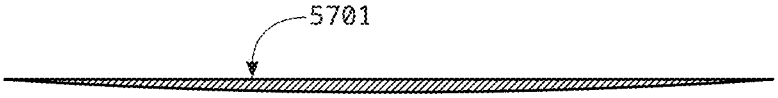
FIG. 58 shows a side section cut of one embodiment of a sheet sprinkler cover in its deformed shape.

FIG. 58 shows a side section cut of one embodiment of a sheet sprinkler cover 5701 in its deformed shape. The sheet sprinkler cover 5701 is flat in its deformed shape. When it is heated, it reverts to its original shape, pulling free of the adhesive. In one embodiment, the sheet sprinkler cover 5701 tears along the perforations, creating an opening for water. In another embodiment, the original shape is a hemisphere and falls away from the opening.

Figure 59:
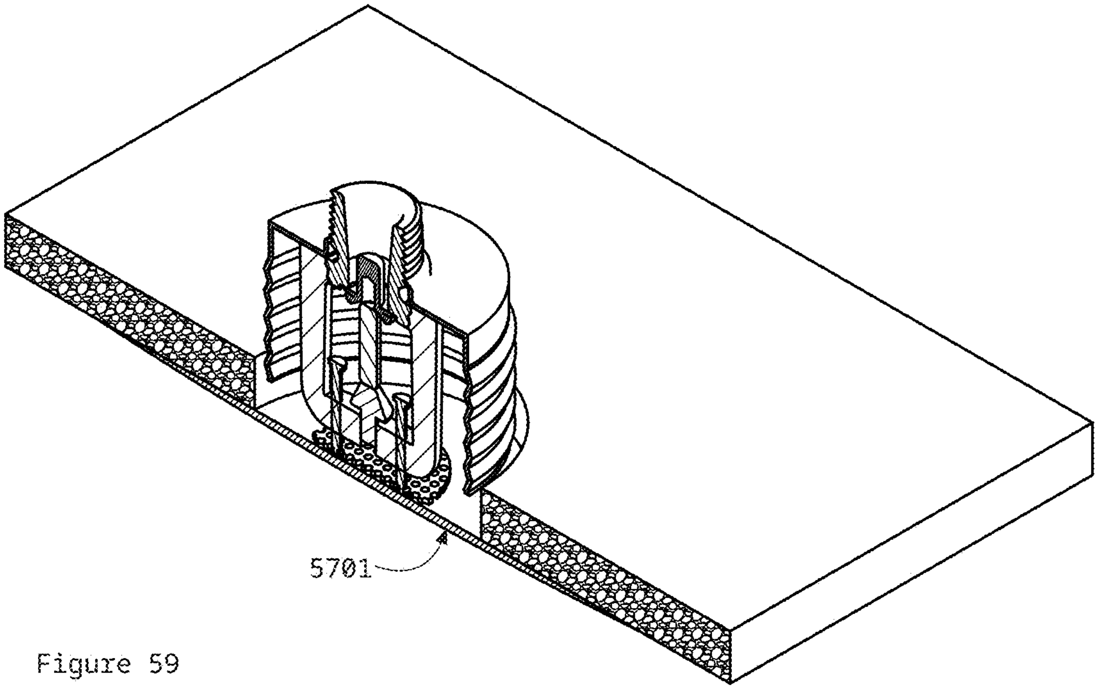
FIG. 59 shows a top perspective section cut view of one embodiment of a sheet sprinkler cover installed below an opening.
Figure 60:
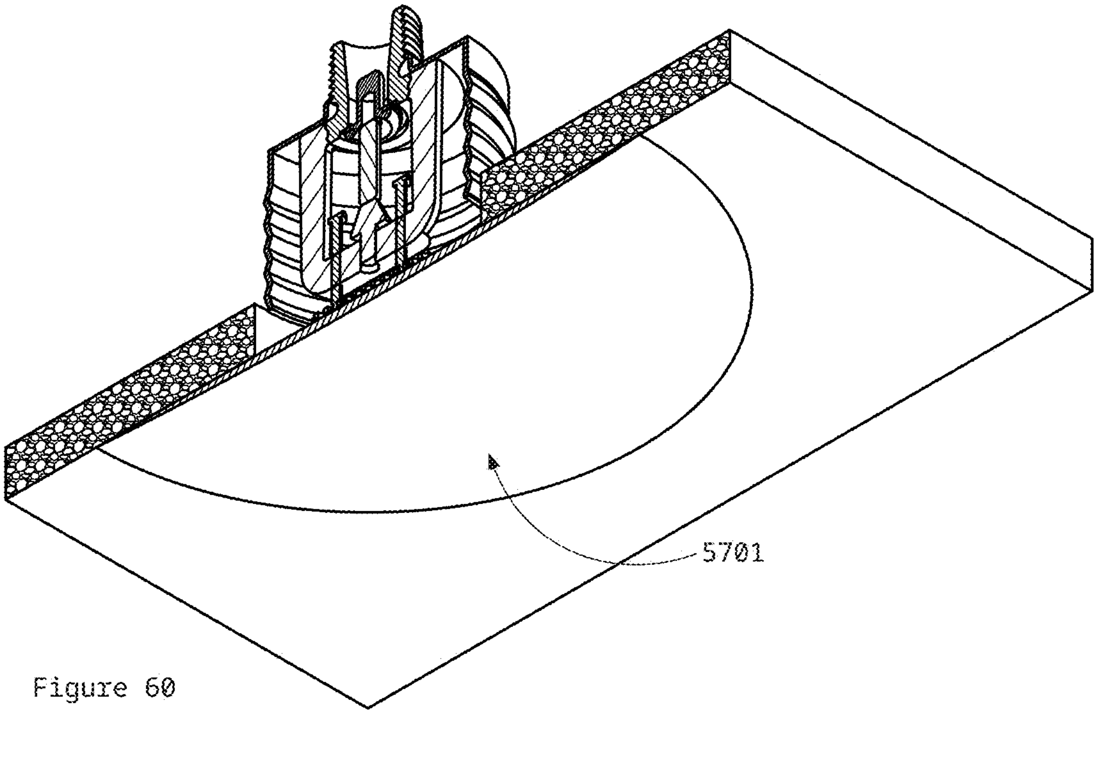
FIG. 60 shows a bottom perspective section cut view of one embodiment of a sheet sprinkler cover installed below an opening.

FIG. 59 shows a top perspective section cut view of one embodiment of a sheet sprinkler cover 5701 installed below an opening. FIG. 60 shows a bottom perspective section cut view of the sheet sprinkler cover 5701.

CONCLUSION

While there have been shown and described illustrative examples of a concealed sprinkler cover, it is to be understood that various other adaptations and modifications may be made within the spirit and scope of the embodiments herein. Thus, while the foregoing description has been directed to specific embodiments, it will be apparent that other variations and modifications may be made to the described embodiments, with the attainment of some or all their advantages. Accordingly, this description is to be taken only by way of example and not to otherwise limit the scope of the embodiments herein.

What is claimed is:

1. An apparatus for concealing and uncovering an opening in a ceiling, comprising:

a collar with an aperture the same size or smaller than the opening in the ceiling, a cover configured to fit within the aperture of the collar, and at least one actuator at least partially comprised of a shape memory polymer, wherein the at least one actuator is a component of the cover, the collar is configured to be installed below the opening in the ceiling with the aperture of the collar located within the opening in the ceiling, the shape memory polymer responds to a temperature at or above a specified transformation temperature, the at least one actuator has an original shape, the at least one actuator is configured to be transformed from the original shape into a deformed shape, the at least one actuator is configured to transform from the deformed shape to the original shape at or above the transformation temperature, and the at least one actuator is configured to displace the cover, at least partially exposing the opening in the ceiling.

2. The apparatus of claim 1, wherein the cover is comprised of a plurality of actuators.

3. The apparatus of claim 2, wherein the plurality of actuators are positioned around the cover, permitting the cover to be installed to at least partially conceal the opening in the ceiling while the plurality of actuators are in the deformed shape.

4. The apparatus of claim 1, wherein a sprinkler head is positioned inside the opening in the ceiling.

5. The apparatus of claim 1, wherein the at least one actuator extends from the cover when the at least one actuator is in the deformed shape.

6. The apparatus of claim 1, wherein the collar is comprised of at least one edge and tapers to the at least one edge.

7. The apparatus of claim 1, wherein the cover is configured to be substantially flat, and forms a flush surface with the collar.

8. The apparatus of claim 1, wherein the cover is at least partially comprised of thermally conductive material.

9. The apparatus of claim 1, wherein the collar is treated to make it indistinguishable from the ceiling.

10. The apparatus of claim 1, wherein the transformation temperature is between 40° C. and 74° C.

11. An apparatus for concealing and uncovering an opening in a surface of a ceiling, comprising:

a collar with an aperture the same size or smaller than the opening and configured to be installed below the opening with the aperture of the collar located within the opening, a cover configured to fit within the aperture of the collar, and at least one actuator at least partially comprised of a shape memory polymer, wherein the at least one actuator is a component of the cover, the shape memory polymer responds to a temperature at or above a specified transformation temperature, and at or above the specified transformation temperature, the at least one actuator is configured to displace the cover, at least partially exposing the opening.

12. The apparatus of claim 11, wherein the at least one actuator has an original shape and a deformed shape, and the at least one actuator is configured to transform from the deformed shape to the original shape at or above the transformation temperature.

13. The apparatus of claim 11, wherein the collar is configured to be installed below the opening in the surface of the ceiling by affixing the collar to the surface of the ceiling.

14. An apparatus for concealing and uncovering an opening in a surface, comprising:

a collar and a cover, wherein the collar is an independent component from the surface, the collar is comprised of an aperture the same size or smaller than the opening in the surface, and the collar is configured to be installed below the opening in the surface with the aperture of the collar located within the opening in the surface, the cover is an independent component from both the surface and the collar, the cover is configured to fit within the aperture of the collar, the cover is comprised of at least one actuator at least partially comprised of a shape memory polymer, the shape memory polymer responds to a temperature at or above a specified transformation temperature, and at or above the specified transformation temperature, the at least one actuator is configured to displace the cover, at least partially exposing the opening in the surface.

15. The apparatus of claim 14, wherein the surface is a surface of a ceiling.

16. The apparatus of claim 14, wherein the at least one actuator has an original shape and a deformed shape, and the at least one actuator is configured to transform from the deformed shape to the original shape at or above the transformation temperature.

17. The apparatus of claim 14, wherein the collar is configured to be installed below the opening in the surface by affixing the collar to the surface.

* * * * *